(12) United States Patent
Dylewski, II

(10) Patent No.: US 12,533,935 B2
(45) Date of Patent: Jan. 27, 2026

(54) TONNEAU COVER FEATURES

(71) Applicant: Leer Group, Elkhart, IN (US)

(72) Inventor: Eugene A. Dylewski, II, Granger, IN (US)

(73) Assignee: Leer Group, Elkhart, IN (US)

( * ) Notice: Subject to any disclaimer, the term of this patent is extended or adjusted under 35 U.S.C. 154(b) by 377 days.

(21) Appl. No.: 18/167,427

(22) Filed: Feb. 10, 2023

(65) Prior Publication Data

US 2023/0256800 A1 Aug. 17, 2023

Related U.S. Application Data

(60) Provisional application No. 63/309,791, filed on Feb. 14, 2022.

(51) Int. Cl.
*B60J 7/19* (2006.01)
*B60J 7/14* (2006.01)

(52) U.S. Cl.
CPC ............... *B60J 7/198* (2013.01); *B60J 7/141* (2013.01)

(58) Field of Classification Search
CPC ... B60J 7/141; B60J 7/1607; B60J 7/19; B60J 7/198
USPC ............................ 296/100.02, 100.06, 100.17
See application file for complete search history.

(56) References Cited

U.S. PATENT DOCUMENTS

| | | | | |
|---|---|---|---|---|
| 4,953,820 A * | 9/1990 | Yoder | ...................... | B25B 5/103 248/231.51 |
| 5,636,893 A * | 6/1997 | Wheatley | ................. | B60J 7/141 296/100.09 |
| 6,604,898 B2 * | 8/2003 | Price | ..................... | B60P 7/0807 410/101 |
| 7,578,645 B2 * | 8/2009 | Terry | .................... | B60P 7/0807 410/101 |
| 7,997,839 B1 * | 8/2011 | Gallegos | ................... | B60R 7/08 410/102 |
| 11,685,242 B2 * | 6/2023 | Schmeichel | ............. | B60J 7/198 296/100.07 |
| 2016/0107515 A1 * | 4/2016 | Shi | .......................... | B60J 7/062 296/100.18 |
| 2018/0118007 A1 * | 5/2018 | Facchinello | ............. | B60J 7/198 |
| 2019/0126734 A1 | 5/2019 | Dylewski, II et al. | | |
| 2020/0108702 A1 | 4/2020 | Dylweski, II et al. | | |
| 2021/0213814 A1 | 7/2021 | Shi et al. | | |
| 2023/0013667 A1 | 1/2023 | Dylewski, II et al. | | |

FOREIGN PATENT DOCUMENTS

WO 2018/018962 A1 2/2018

OTHER PUBLICATIONS

International Search & Written Opinion; Date of Mailing May 23, 2023; PCT/US2023/012889; Leer Group; "Tonneau Cover Features".

(Continued)

*Primary Examiner* — Jason S Daniels
(74) *Attorney, Agent, or Firm* — Barnes & Thornburg LLP

(57) ABSTRACT

A clamp assembly for use with a tonneau cover assembly is provided. The clamp assembly includes a clamp mount, a clamp back, and a clamp fastener. The clamp back is located opposite the clamp mount. The clamp fastener is extended through the clamp mount and the clamp back. The clamp fastener includes an attachment member configured to receive one or more securement structures that are not otherwise attached to the clamp.

20 Claims, 26 Drawing Sheets

(56) References Cited

OTHER PUBLICATIONS

Cap Clamp w/Eye Bolt | GCI Inc.—Clamp Mounting Systems for the Truck Cap and Lid Industry, Apr. 3, 2023—The Wayback Machine—https://web.archive.org/web/20220123022954/http://gciclamps.com/products/cap-clamp-w-eye-bolt.
Extended European Search Report 24166034.9-1009 / 4371860; Leer Group; Dated Jun. 4, 2024.

* cited by examiner

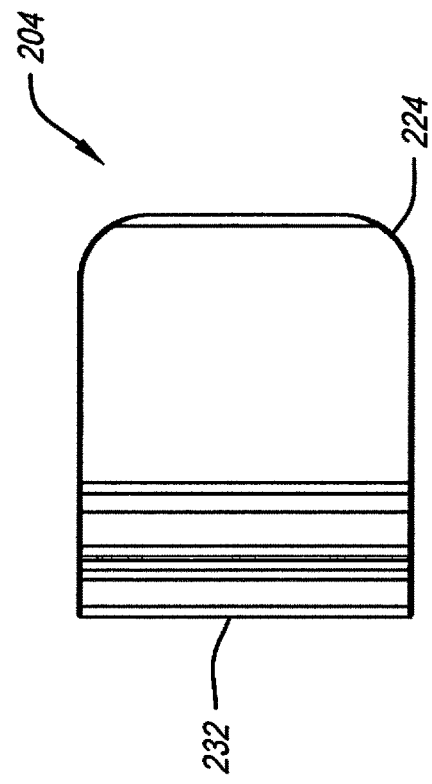
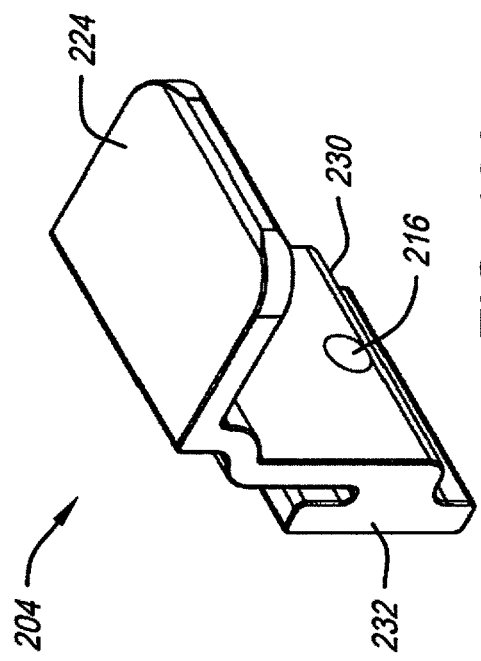
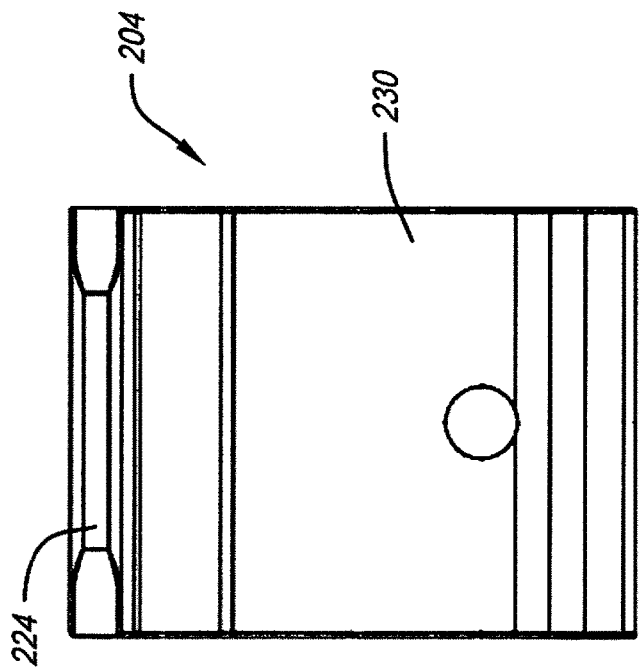
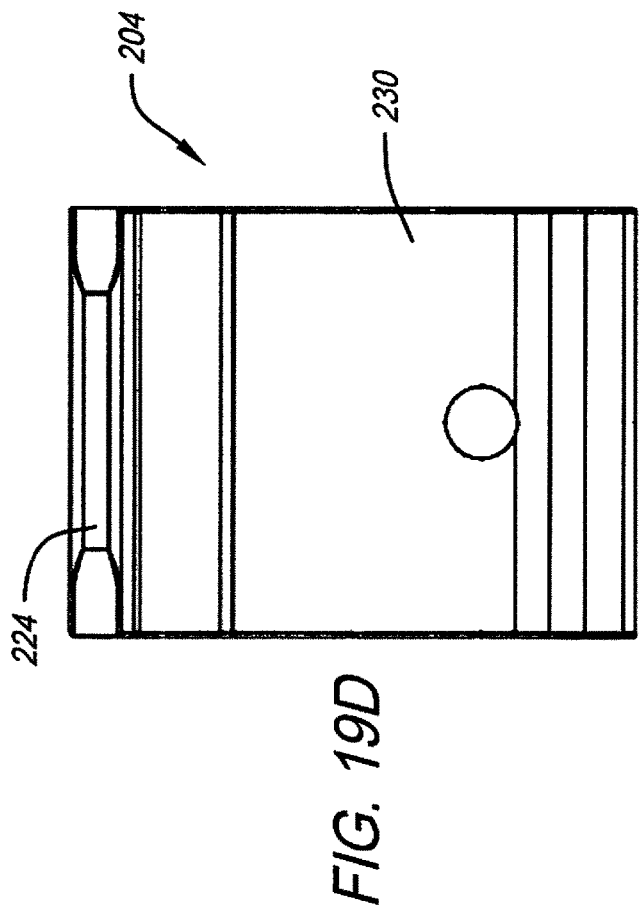
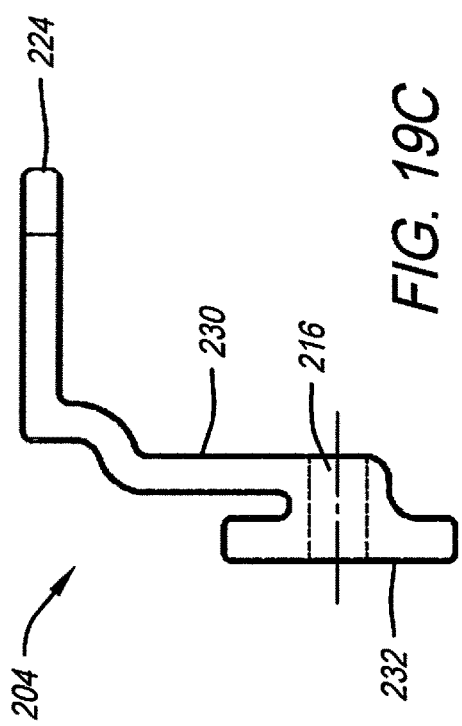

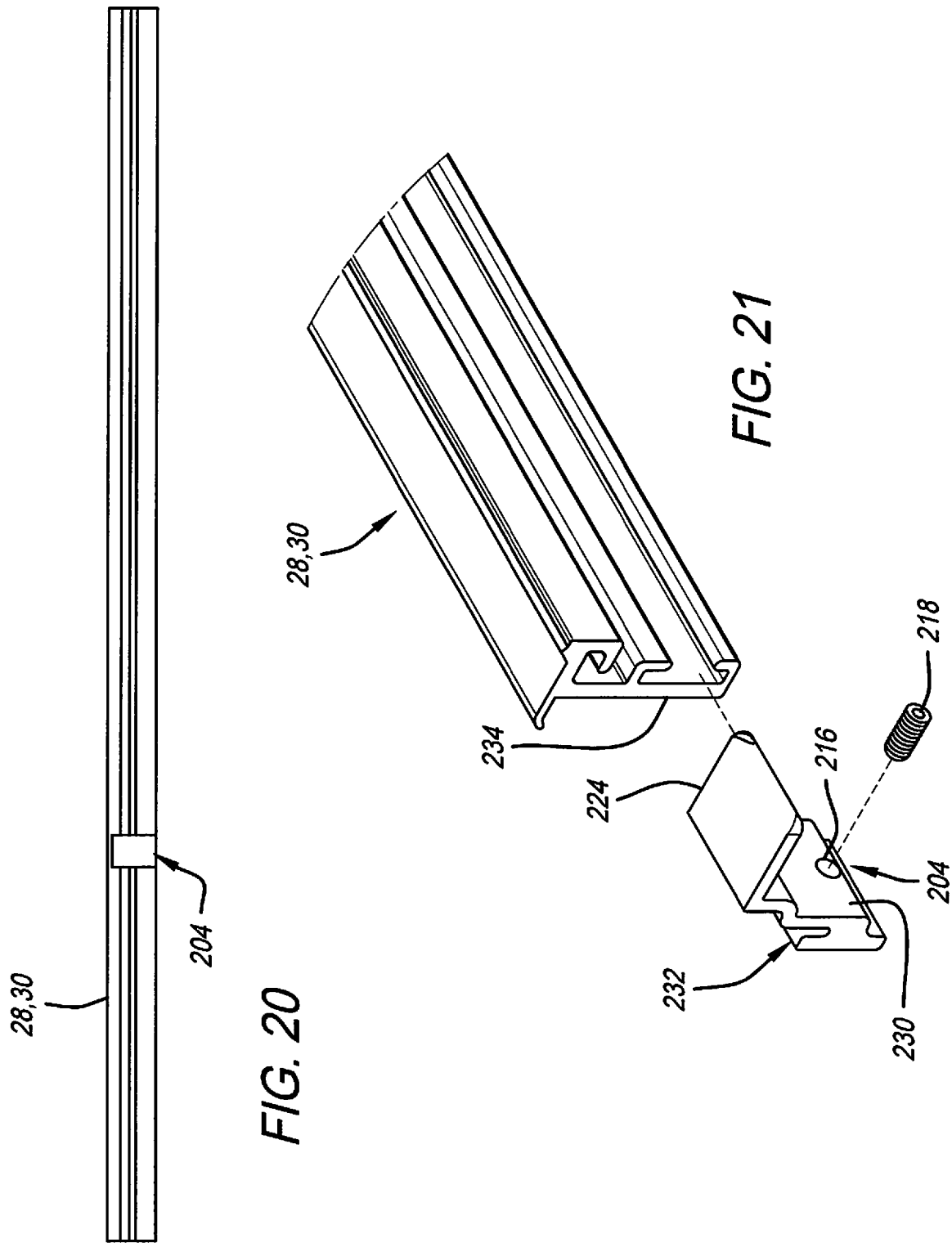

TONNEAU COVER FEATURES

RELATED APPLICATIONS

The present Application relates to and claims priority to U.S. Provisional Patent Application, Ser. No. 63/309,791, filed on Feb. 14, 2022. The subject matter disclosed in that Provisional Application is hereby expressly incorporated into the present Application.

TECHNICAL FIELD AND SUMMARY

The present disclosure relates to trucks, such as pickup trucks, and truck beds or cargo boxes used on pickup trucks and like vehicles. In particular, the present disclosure relates to a truck bed cover, also known as a tonneau cover, that includes new structural features used to secure such covers on the truck beds.

Tonneau or truck bed covers that provide a covering for a truck bed or cargo box when used in combination with its sidewalls and tailgate. Covering the bed of a pickup truck helps create a secure compartment where items may be stored out of view when the tailgate is in an upward and latched position. Embodiments of a tonneau cover may include the cover portion that is suspended over the truck bed between the sidewalls. Typically, a frame or rail assembly may be employed that attaches to the opposing sidewalls to secure the cover onto the truck.

An illustrative embodiment of the present disclosure provides a clamp assembly for use with a tonneau cover assembly. The clamp assembly includes a first clamp member, a second clamp member, and a clamp fastener. The second clamp member is located opposite the first clamp member to form a space located therebetween. The clamp fastener extended through the first clamp member, the space between the first clamp member and the second clamp member, and the second clamp member. The clamp fastener includes an attachment member configured to receive securement structures that are not otherwise attached to the clamp assembly.

In the above and other embodiments, the clamp assembly may further comprise: the attachment member being an eyebolt that includes a ring which extends opposite of a threaded post portion of the eyebolt; the attachment member includes a tie-down ring that extends opposite of a threaded post portion of the attachment member; the attachment member includes a tie-down ring positioned adjacent a head end and a threaded post portion that extends from the head end of the attachment member; the attachment member is integrally part of the clamp fastener; the attachment member and the clamp fastener is a single-component structure; the attachment member includes an opening that the clamp fastener extends through to secure the attachment member to the first clamp member; the attachment member includes a first opening bounded by a ring and a second opening disposed through the attachment member, wherein the clamp fastener being extendable through the second opening to secure the attachment member to the first clamp member; the attachment member includes an opening bounded by a ring, wherein a portion of the ring is oriented transverse to a second portion of the ring; the attachment member includes an opening bounded by a ring, wherein the opening is positionable to a plurality of orientations with respect to the clamp assembly; the first clamp member being a clamp mount and the second clamp member being a clamp back; the attachment member being integrally part of the clamp fastener, wherein the attachment member includes a ring, and, wherein rotation of the ring rotates the clamp fastener; the attachment member being integrally part of the clamp fastener, wherein rotation of the attachment member rotates the clamp fastener; and the rotation of the clamp fastener causes the clamp fastener to extend into the second clamp member.

Another illustrative embodiment of the present disclosure provides a clamp assembly for use with a tonneau cover assembly. The clamp assembly includes a clamp mount, a clamp back, and a clamp fastener. The clamp back is located opposite the clamp mount. The clamp fastener is extended through the clamp mount and the clamp back. The clamp fastener includes an attachment member configured to receive securement structures that are not otherwise attached to the clamp. Rotation of the attachment member rotates the clamp fastener.

In the above and other embodiments, the clamp assembly may further comprise: the attachment member includes an opening bounded by a ring, wherein the opening is positionable to a plurality of orientations with respect to the clamp assembly; the clamp mount and the clamp back form a space located therebetween, and, wherein the clamp fastener is extended through the clamp mount, the space between the clamp mount and the clamp back, and the clamp back; and the attachment member includes a ring.

Another illustrative embodiment of the present disclosure provides a clamp assembly for use with a tonneau cover assembly. The clamp assembly includes a clamp mount, a clamp back, a clamp fastener, and a tie-down ring. The clamp back is located opposite the clamp mount. The clamp fastener includes a head end and a threaded post portion that extends from the head end. The threaded post portion is extended through the clamp mount and the clamp back. The tie-down ring is positioned adjacent the head end and the threaded post portion of the clamp fastener.

In the above and other embodiments, the clamp assembly may further comprise the tie-down ring including an opening through which the threaded post portion of the clamp fastener extends.

Additional features and advantages of the tonneau cover features will become apparent to those skilled in the art upon consideration of the following detail description of the illustrated embodiments exemplifying carrying out the tonneau cover features as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 19A is a perspective view of a tab;

FIG. 19B is a top view of the tab;

FIG. 19C is a side view of the tab;

FIG. 19D is a front view of the tab;

FIG. 20 is a side view of a rail;

FIG. 21 is a detail perspective view of a portion of the rail and tab;

Corresponding reference characters indicate corresponding parts throughout the several views. The exemplification set out herein illustrates embodiments of the tonneau cover features, and such exemplification is not to be construed as limiting the scope of the tonneau cover features in any manner.

DETAILED DESCRIPTION OF THE DRAWINGS

Figure 1:
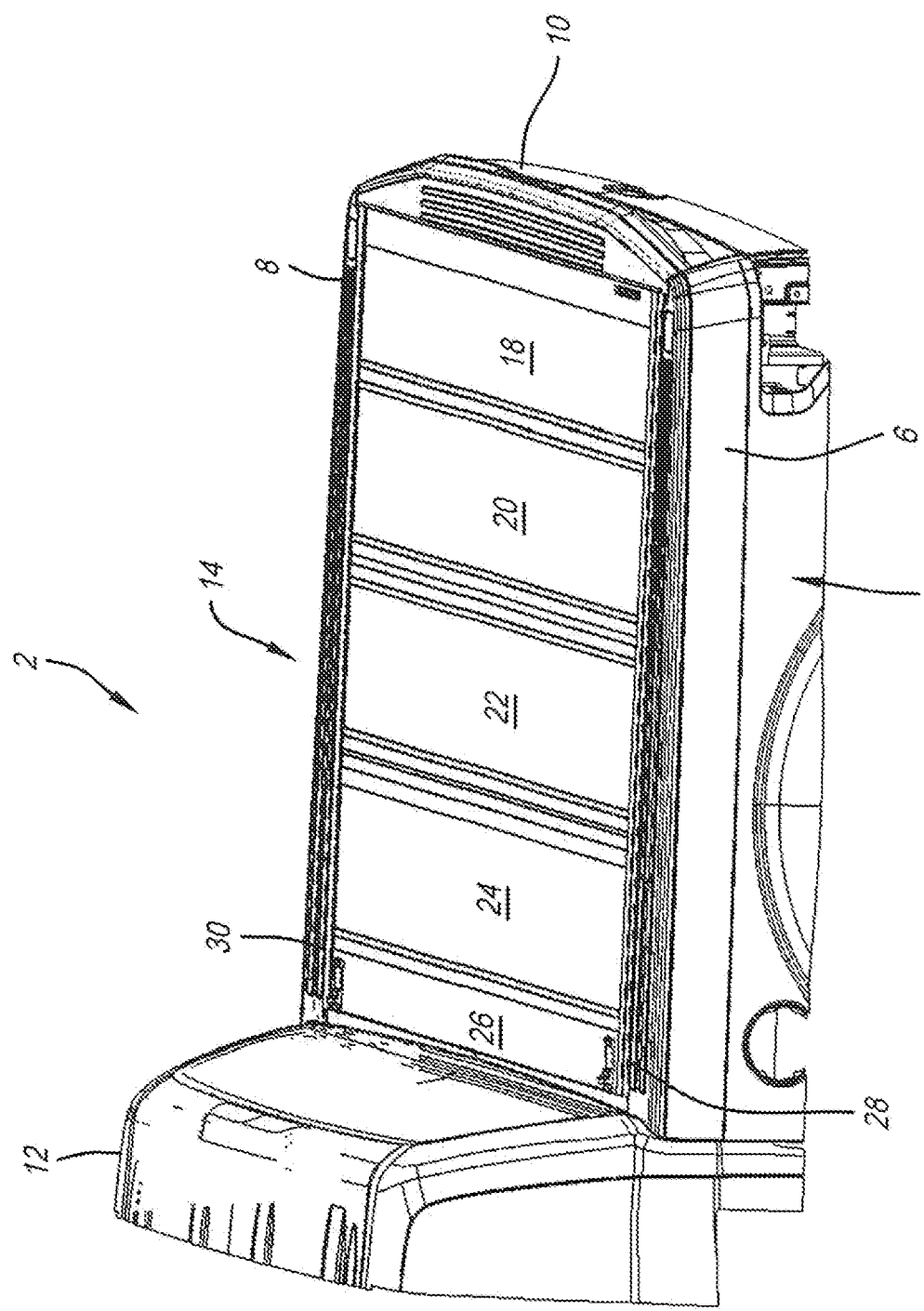
FIG. 1 is a rear perspective view of a pickup truck with an accompanying truck bed having a tonneau cover lying over top.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a pickup truck that includes a bed section located rear of a cab section, wherein the bed section, also known as a cargo box, is bounded on each side by opposing first and second upward-extending sidewalls, respectively. An illustrative embodiment of a tonneau cover typically includes: a first panel section pivotable with respect to the opposing first and second upward-extending sidewalls; a latching assembly attached to the first panel section and which selectively secures and releases the first panel section with respect to the first and second upward-extending sidewalls of the truck; wherein the latching assembly includes at least one adjustable pinch latch assembly; wherein the at least one adjustable pinch latch assembly is located on the first panel section and adjacent the first upward-extending sidewall of the truck; wherein the at least one adjustable pinch latch assembly comprises: a latch handle portion; a latch base located on the first panel section adjacent the latch handle portion; and a set member selectively engageable with the latch base and the first panel section. The set member is adjustable so as to selectively secure the latch base onto the first panel section at a plurality of positions on the first panel section. When the latch base is secured to the first panel section the latch base determines the position of the latch handle portion relative to the first upward-extending sidewall of the truck.

Subject matter related to a variety of tonneau covers are disclosed in U.S. Pat. No. 10,800,234, entitled "Folding Cover Attachment Systems," issued on Oct. 13, 2020, as well as U.S. Pat. No. 11,299,021, entitled "Multi-Panel Tonneau Cover," issued on Apr. 12, 2022, and are hereby expressly incorporated into this present Application in their entirety.

An illustrative embodiment of the present disclosure provides a clamp assembly having either an eyebolt, tie-down ring, or other attachment member, attached thereto and configured to receive a safety tether clip or hook that is also coupled to at least one panel of the tonneau cover. The clip, hook, or other securement of the tether may attach to the eyebolt or tie-down ring attached to the clamp. The clamp assembly may then attach to a rail for securing same to a cargo box sidewall. It is appreciated that other structures of the tonneau cover or other accessories may additionally, or alternatively, attach to this attachment member.

Another illustrative embodiment of the present disclosure provides a hook and tab assembly configured to hold secure one or more panels on the cargo box while lying flat thereon and without the use of a latch assembly. A hook may be secured to the front underside of a panel located behind the panel to be secured. A tab may be secured to the rail and positioned forward of a movable panel section. When closing the cover, the panel section with the hook attached thereto pivots onto the cargo box sidewalls. This positions a portion of the hook underneath the tab. Any attempt to lift the panel section, located in front of the panel section with the hook secured thereon, will fail. The tab serves as a barrier between the hook and the panel to secure the panel onto the cargo box. Conversely, when opening the cover, the rear portion of the panel section with the hook attached thereto, pivots upward, which moves the hook away from the tab, thereby releasing the panel located in front of the panel section with the hook secured thereon. There is no unlatching step needed at this stage other than lifting the panel section with the hook attached thereto. It is appreciated that the tab may be positioned underneath a spacer or hinge located adjacent the panel with the hook attached thereto.

A rear perspective view of a truck 2, with an accompanying truck bed 4 comprising sidewalls 6 and 8, is shown in FIG. 1. This view also depicts tailgate 10 and cab section 12 located opposite each other with truck bed 4 located therebetween. Illustratively, a tonneau cover 14 is shown shrouding interior 16 of cargo box or truck bed 4 (see, also, FIG. 2). Tonneau cover 14 is composed of a plurality of panel sections 18, 20, 22, and 24 that are pivotably attached to each other as shown (see, also, FIGS. 2, 3, and 4). A bulkhead panel assembly 26 is secured to rails 28 and 30, which are positioned along the inner periphery of sidewalls 6 and 8, respectively. Illustratively, panel section 18 is pivotably attached to bulkhead panel assembly 26. It is appreciated that the tonneau cover 14 shown herein is illustrative.

Figure 2:
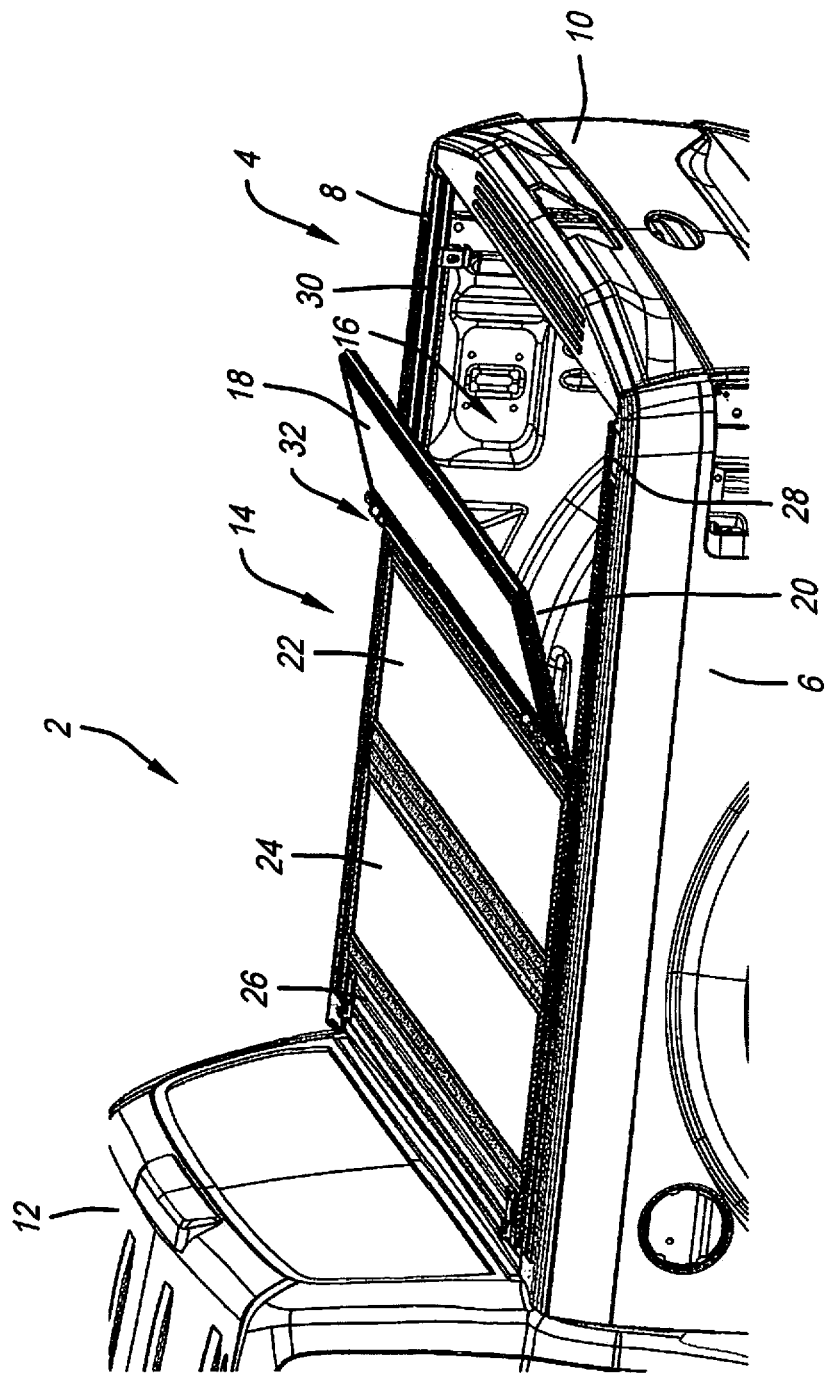
FIG. 2 is another perspective view of the truck of FIG. 1 depicting the tonneau cover in a partially folded-up position.

Another perspective view of truck 2 is shown in FIG. 2. In this view, tonneau cover 14 is depicted partially shrouding truck bed 4. In particular, panel section 18 is folded over panel section 20. In addition, panel section 20 is pivoted with respect to panel section 22. By folding at least one of the panel sections, interior 16 of truck bed 4 becomes accessible. Latching assembly 32 is shown on panel or panel section 18. It is contemplated that latching assembly 32 will engage rails 28 and 30 to latch thereto when all of panel sections 18, 20, 22, and 24 of tonneau cover 14 are laid flat covering truck bed 4 and shrouding interior 16. Because latching assembly 32 is directed towards interior 16 of truck bed 4, such latches are concealed from the exterior of truck 2. Additionally, it is appreciated that latching assembly 32 need not be employed on the underside of every panel section.

Figure 3:
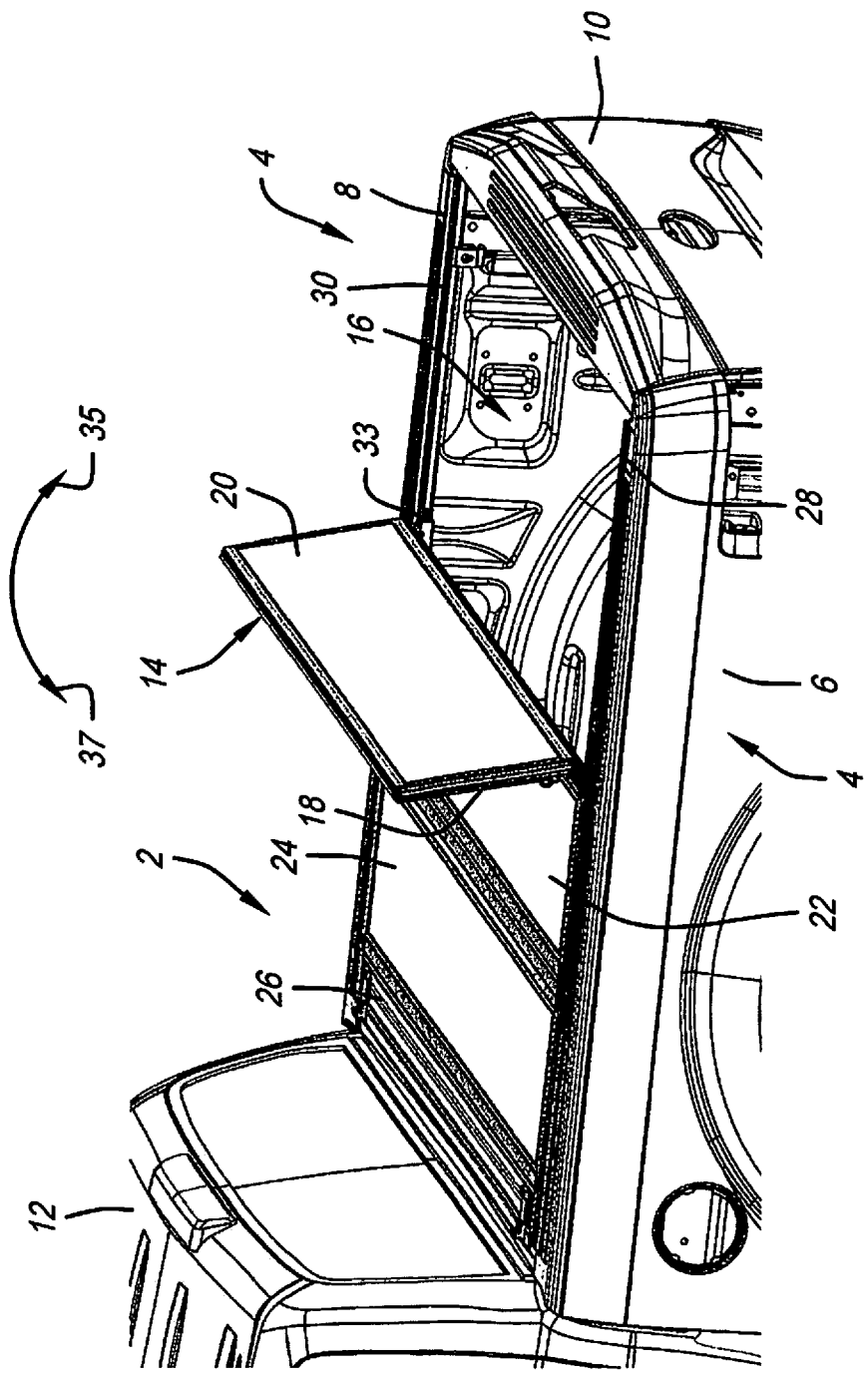
FIG. 3 is another perspective view of the tonneau cover further folded-up.

Another perspective view of truck 2 is shown in FIG. 3. Similar to the views shown in FIGS. 1 and 2, truck 2 depicts tonneau cover 14 laying atop sidewalls 6 and 8 via rails 28 and 30 to shroud a portion of interior 16 of bed 4. This view, however, also shows panel sections 18 and 20 of tonneau cover 14 folded over further than that shown in FIG. 2 to further reveal interior 16 underneath. Also shown in this view is a mechanical catch assembly 33 attached to rail 30 and bulkhead panel assembly 26.

Figure 4:
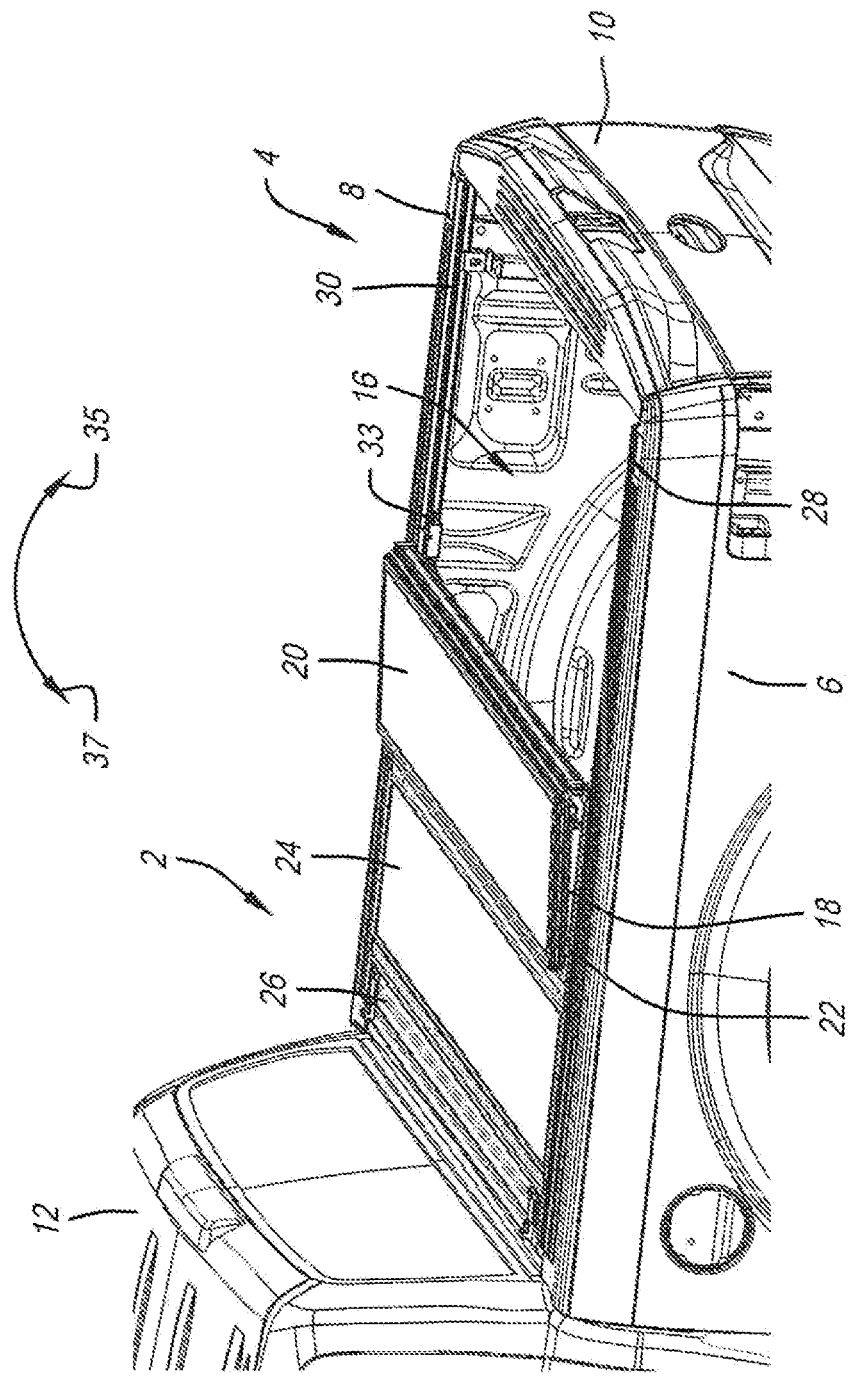
FIG. 4 is another perspective view of the truck with the tunneau cover further folded-up.

A similar perspective view of truck 2, as shown in FIGS. 1, 2, and 3, is also shown in FIG. 4. This view differs from FIGS. 1, 2, and 3 in that panel sections 18 and 20 are folded over onto panel section 22. Illustratively, panel sections 18 and 20 have been pivoted in direction 37 toward bulkhead panel assembly 26.

Figure 5:
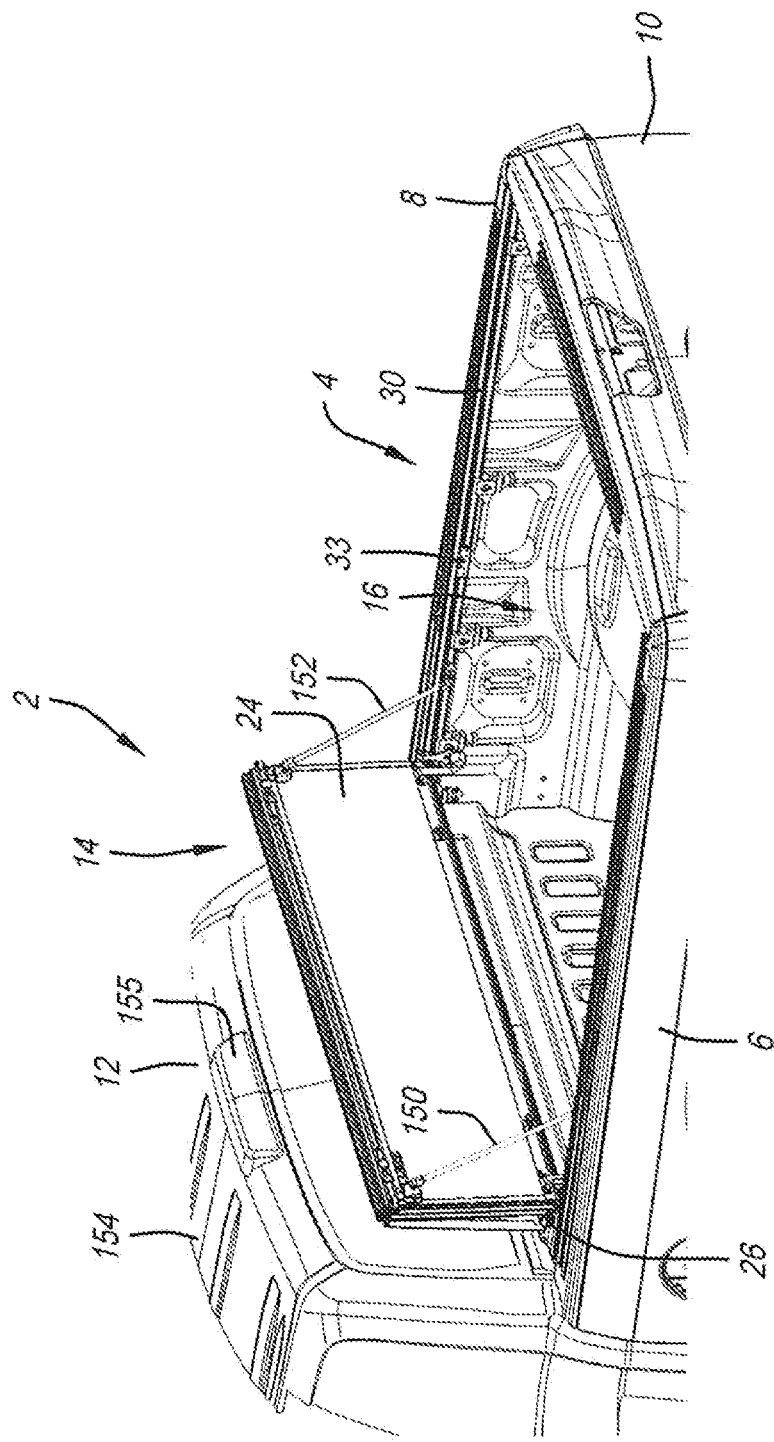
FIG. 5 is another perspective view of the truck with the tonneau cover folded up into a stack set up right.

A similar perspective view of truck 2, as shown in FIGS. 1, 2, 3, and 4, is also shown in FIG. 5. This view differs from the others in that panel sections 18, 20, 22, and 24 are folded over and stacked vertically onto bulkhead panel assembly 26. Prop rods 150 and 152 are both coupled to panel section 24 and onto rails 28 and 30, respectively. The prop rods assist in keeping the stack of panel sections 18, 20, 22 and 24 upright while truck 2 is moving.

Figure 6:
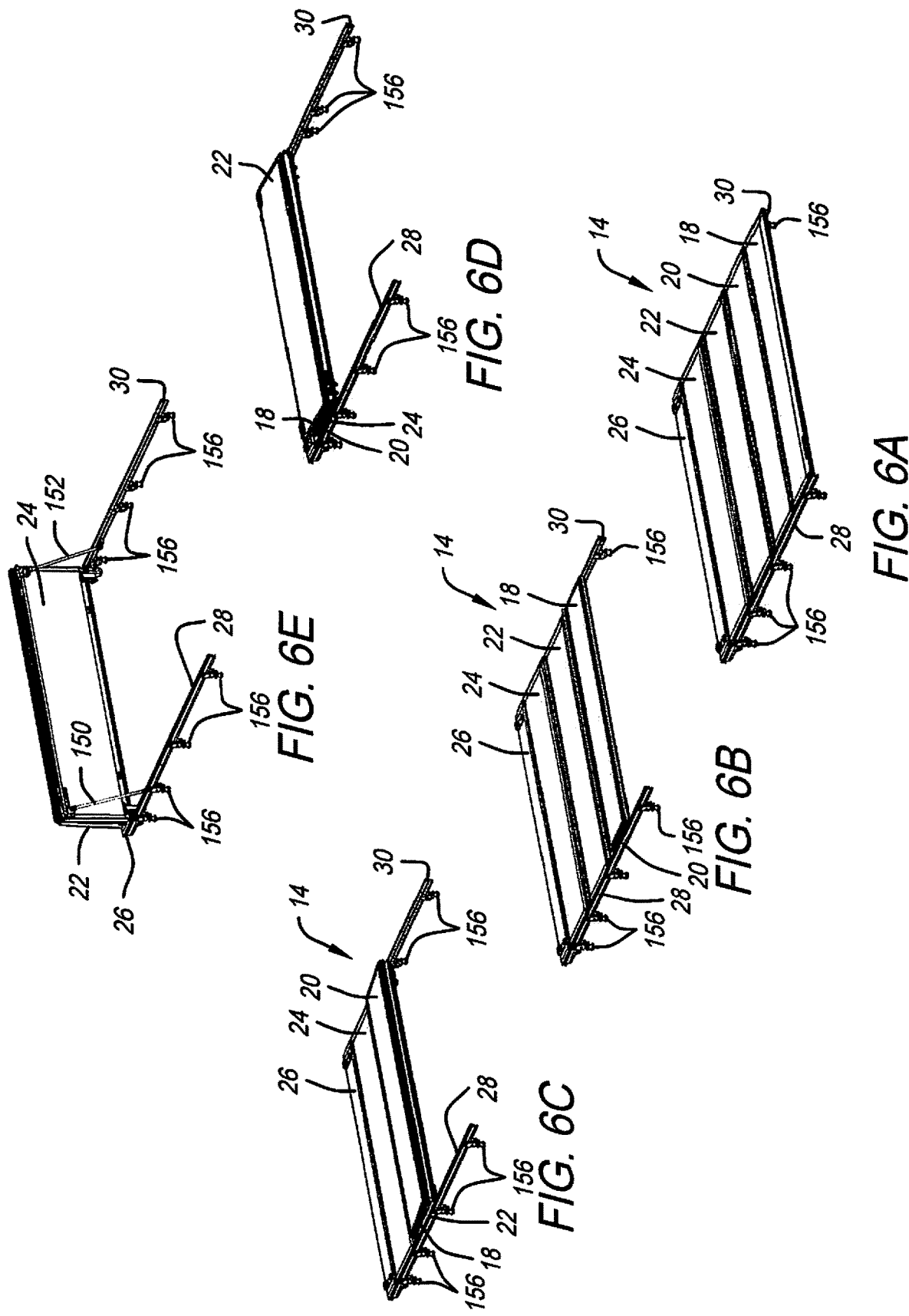
FIGS. 6A, 6B, 6C, 6D, and 6E are progression views of the tonneau cover assembly shown between fully closed and fully open positions.

Perspective, isolated, progression views showing tonneau cover 14 on rails 28 and 30, with the tonneau cover being moved from a full closed position to a full open position, is shown in FIGS. 6A, 6B, 6C, 6D, and 6E. The view shown in FIG. 6A depicts tonneau cover 14 in its full closed position on rails 28 and 30. Here, as with the view shown in FIG. 1, tonneau cover 14 completely shrouds interior 16 of truck bed 4. As such, panel sections 18, 20, 22, and 24 are unfolded and lay on rails 28 to 30. Bulkhead panel assembly 26 is shown at the forward end of tonneau cover 14 adjacent panel section 24.

The view shown in FIG. 6B is the same as that of FIG. 6A, but with panel section 18 stacked on panel section 22 to begin opening tonneau cover 14, similar to that shown in FIG. 2. The folding of tonneau cover 14 continues in FIG. 6C where now both panel sections 18 and 20 are stacked onto panel section 22. By progressing with this stacked arrangement, it is appreciated that more of interior 16 of truck bed 4 will be exposed as further shown in FIGS. 4 and 5.

Further, stacking all of panel sections 18, 20, and 22 onto panel section 24 is shown in FIG. 6D. Lastly, as shown in FIG. 6E, the stack of panel sections 18, 20, 22, and 24 are pivoted upright onto bulkhead panel assembly 26, which supports the stack in its upright position. Prop rods 150 and 152 attach to both panel section 24 and onto rails 28 and 30, respectively, to maintain the stack of panel sections in this upright position while the truck is moving. Further shown in this and the other views, are clamps 156 on both rails 28 and 30. Clamps 156 are configured to attach rails 28 and 30 to their adjacent sidewalls 6 and 8, respectively. It is appreciated that the number of panel sections is illustrative. More or less panel sections may employ the features disclosed herein.

Figure 7:
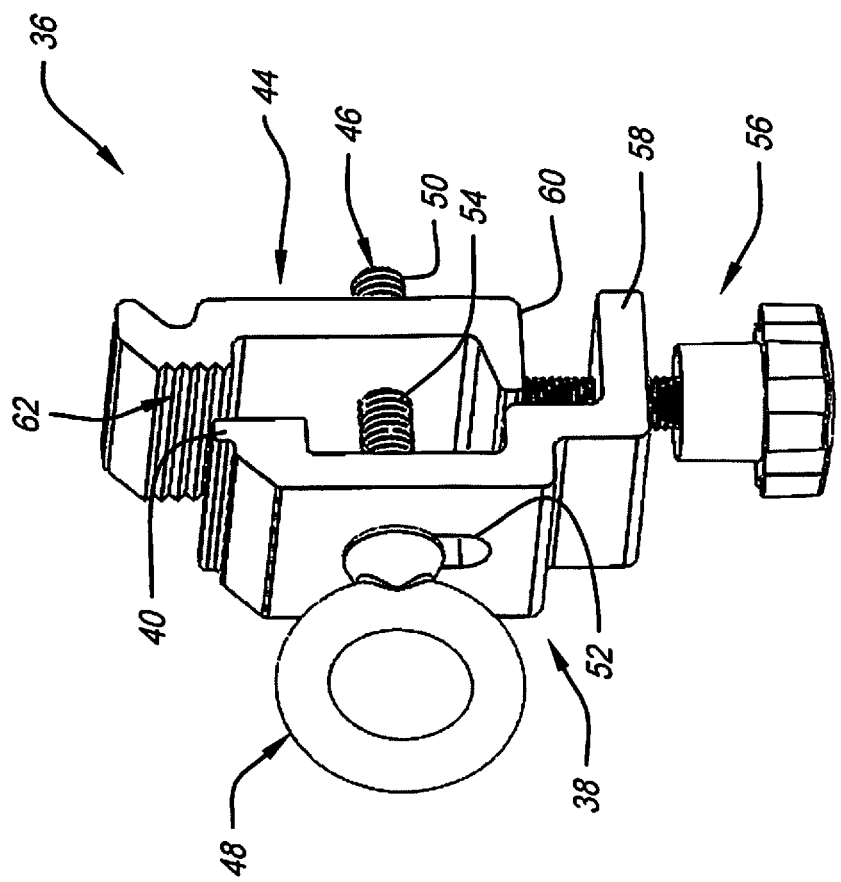
FIG. 7 is a perspective view of a clamp assembly.

A perspective view of a clamp assembly 36 is shown in FIG. 7. It is appreciated that clamp assembly 36 may be used on rails 28 and 30 (see, also, FIGS. 2 and 5) to secure same to cargo box sidewalls 6 and 8, respectively. Clamp assembly 36 includes a clamp mount 38 having an upward extending flange 40 that fits into a clamp slot 42 (see, also, FIG. 8) in rail 30. In this illustrative embodiment of clamp assembly 36, opposite clamp mount 38 is clamp back 44 coupled together via clamping fastener 46 extending therebetween. Extending from clamping fastener 46 is a attachment member, in this case, an eyebolt ring 48. It is appreciated that the attachment member, such as eyebolt ring 48, is positioned on clamp assembly 36 so that it extends into interior 16 (see FIG. 2) of truck bed 4 so that structures of tonneau cover 14 (or other desired accessories) may be attached to the eyebolt ring. Clamping fastener 46 may also include a threaded post 50 that extends through both clamp mount 38 at bore 52 and threaded bore 54 disposed through clamp back 44. In certain embodiments, eyebolt ring 48 may be rotated to rotate threaded post 50 to draw clamp mount 38 in clamp back 44 toward each other to clamp the rail to the sidewall.

Also shown in this illustrative embodiment of clamp assembly 36 is an adjustment screw 56 disposed through clamp base 58 to engage clamp back base 60 for moving clamp back 44 vertically as needed during the clamping process. This allows clamp assembly 36 to accommodate downturned flanges of different character on different types of truck bed sidewalls. It is also appreciated that bore 52 disposed through clamp mount 38 may be a slot so clamping fastener 46 can move vertically with respect to clamp mount 38 when clamp back 44 is being moved vertically. An illustrative gripping surface 62 may be formed on clamp back 44, as shown, to assist in holding the rail against the truck bed sidewall.

Figure 8:
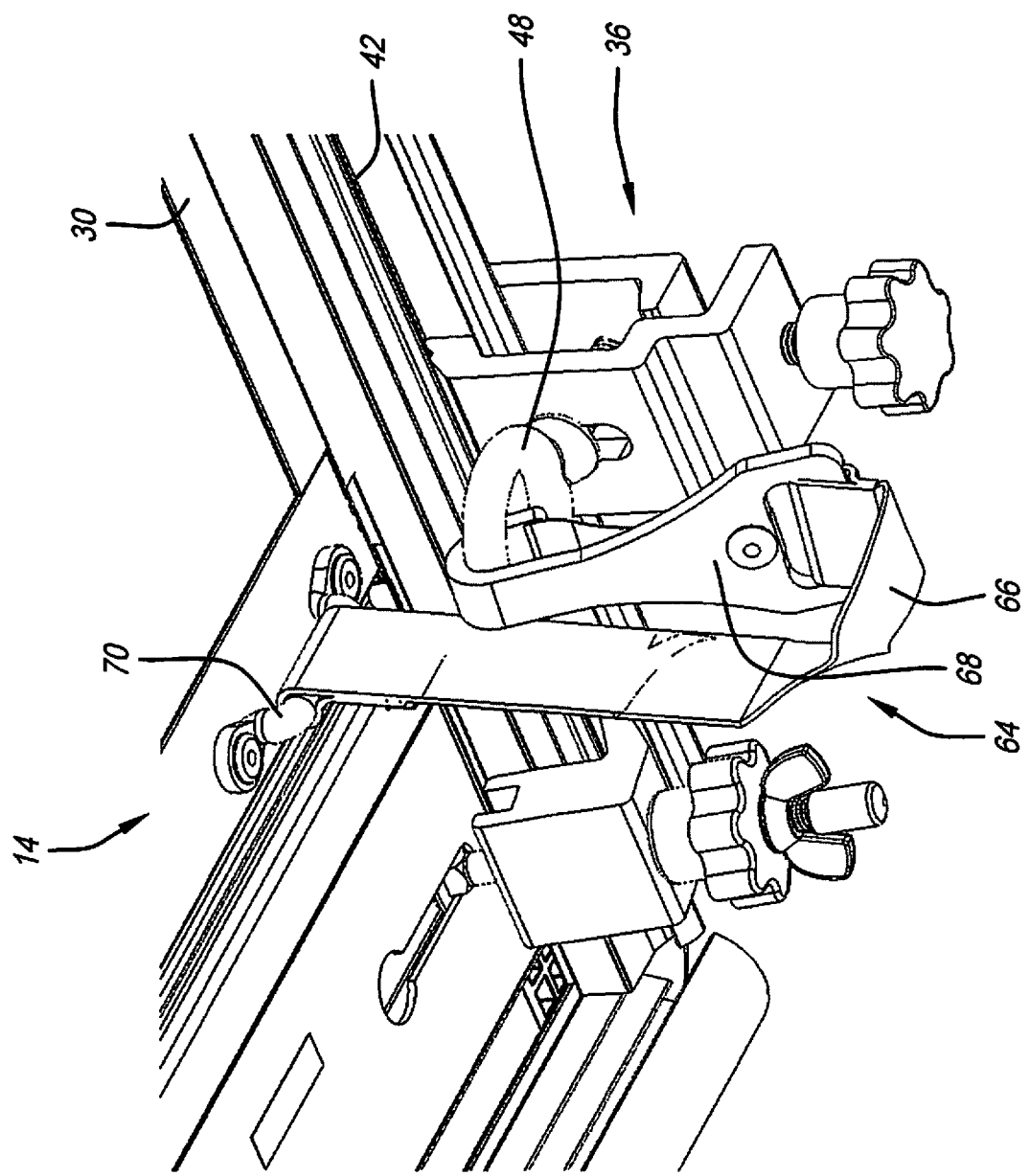
FIG. 8 is an underside perspective detail view of a portion of the tonneau cover and a clamped rail with a tether assembly attached to the tonneau cover and the clamp assembly.

An underside perspective view of a portion of tonneau cover 14 with a tether assembly 64, attached to both tonneau cover 14 and clamp assembly 36, is shown in FIG. 8. Here, tether assembly includes a strap 66 attached to hook 68 and bracket 70 at opposing ends. With respect to hook 68, it is shown coupled to eyebolt ring 48 of clamp assembly 36. Such tether assemblies are known to be safety features that provide a secondary attachment for tonneau covers if their latching mechanisms would fail. In this case, hook 68, attaching tether assembly 64 to eyebolt ring 48 of clamp assembly 36, provides a different structure for tonneau cover 14 to attach to.

Figure 9:
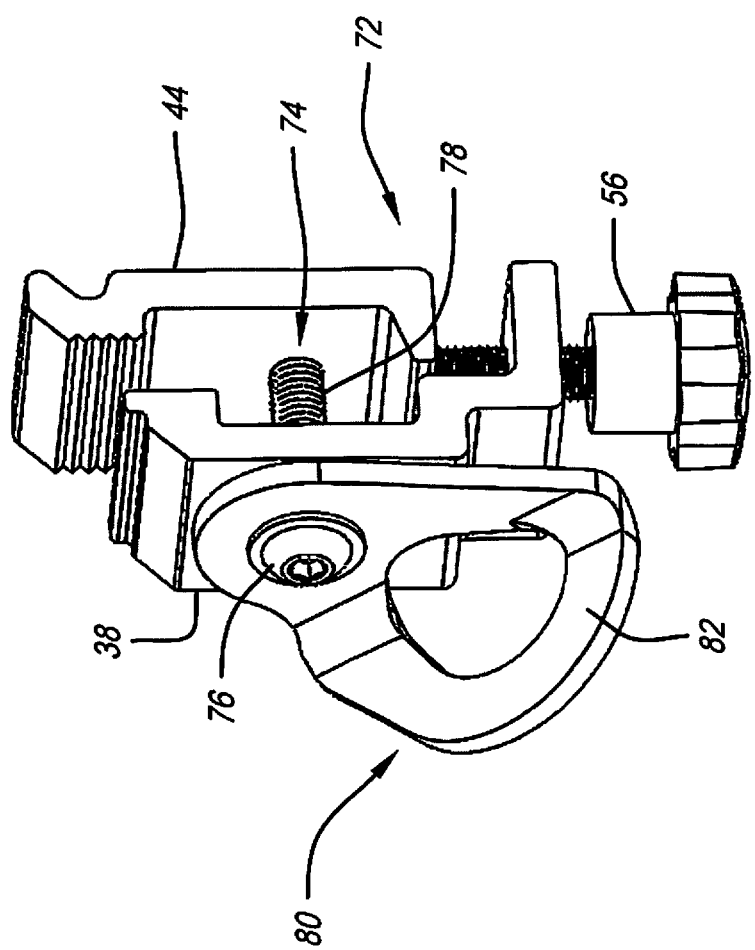
FIG. 9 is a perspective view of another illustrative embodiment of a clamp assembly.

Another illustrative embodiment of the present disclosure provides a clamp assembly 72, an isolated prospective view of which is shown in FIG. 9. Similar to clamp assembly 36, clamp assembly 72 includes clamp mount 38 and clamp back 44. There is also an adjustment screw 56 acting on clamp back 44 like that previously identified. A clamping fastener 74 is disposed through both clamp mount 38 and clamp back 44 like that previously described with respect to clamp assembly 36. In this embodiment, however, clamping fastener 74 includes a head 76 attached to threaded post 78. A tie-down ring 80 is coupled to clamping fastener 74, illustratively adjacent clamp mount 38 and secured thereto when clamp assembly 72 is clamped onto a rail, such as rail 30, previously described (see, also, FIG. 10). Tie-down ring 80 includes securement ring 82 and a fastener hole 84 (see FIG. 11). Securement ring 82 is an attachment member for the securement structure like a hook or other device to be clamped onto clamp assembly 72. This illustrative embodiment of tie-down ring 80 includes portions bent with respect to each other so that clamping fastener 74 can be disposed through tie-down ring 80 while the attachment member of same extends from clamp assembly 72 in order to be more easily accessible to securing devices.

Figure 10:
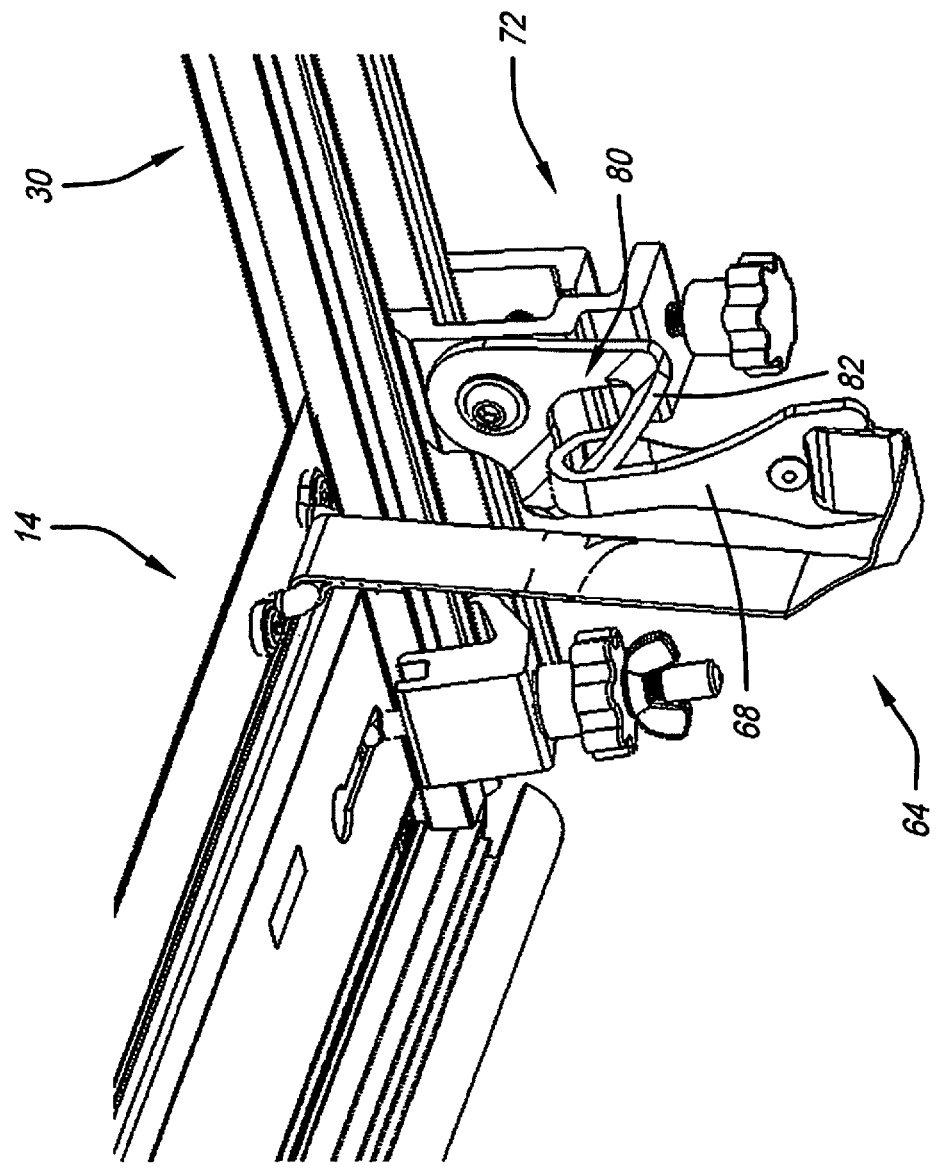
FIG. 10 is another underside perspective detail view of a portion of the tonneau cover and a clamped rail with a tether assembly attached to the tonneau cover and the clamp assembly.

An underside perspective view of a portion of tonneau cover 14, with tether assembly 64 attached thereto, as well as to clamp assembly 72, is shown in FIG. 10. Here, like that shown in FIG. 8 with respect to clamp assembly 36, hook 68 couples to securement ring 82 of tie-down ring 80 for safety attachment of tonneau cover 14 to clamp assembly 72.

Figure 11:
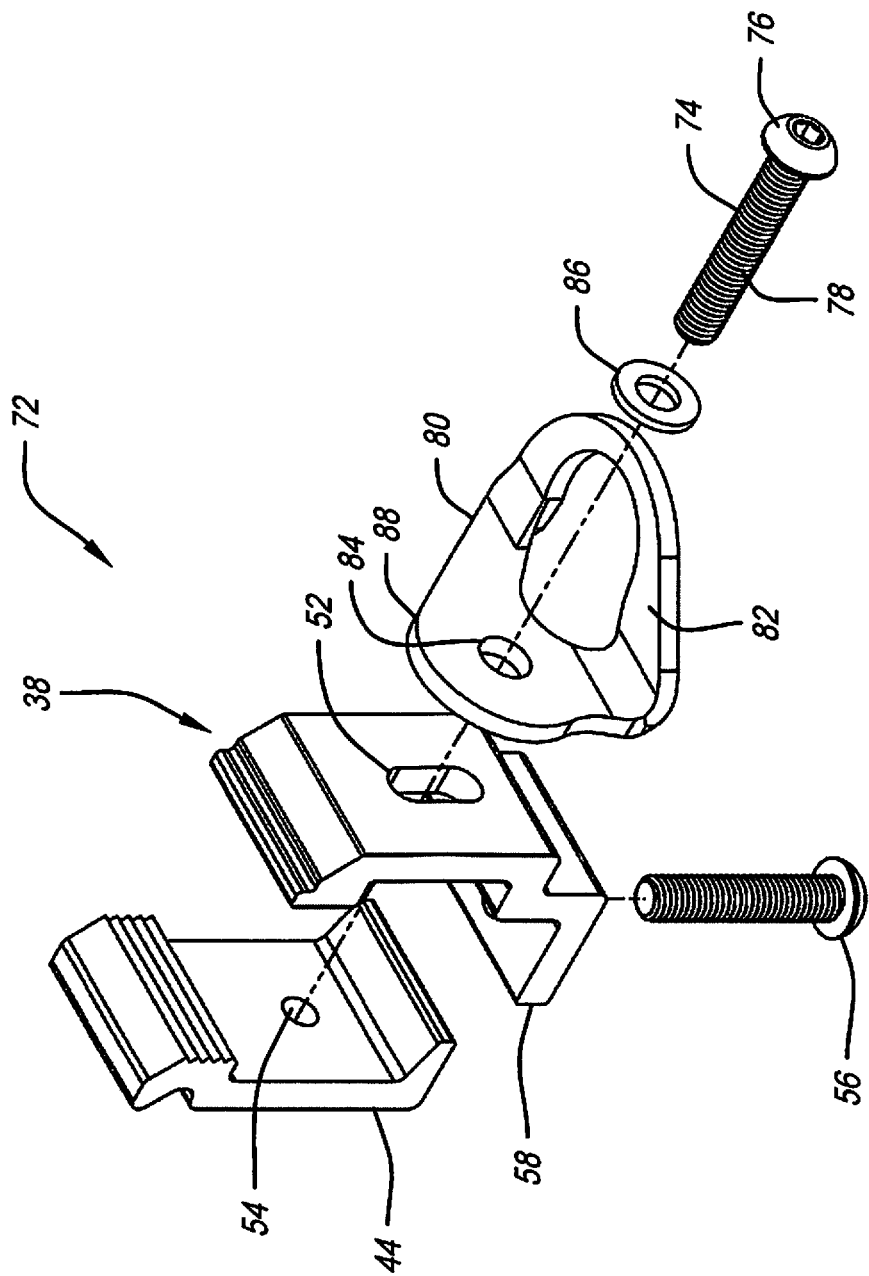
FIG. 11 is a perspective exploded view of a clamp assembly.

An exploded perspective view of clamp assembly 72 is shown in FIG. 11. Like clamp assembly 36, clamp assembly 72 includes clamp mount 38, clamp back 44, and adjustment screw 56. This view also shows bore 52 disposed through clamp mount 38, as well as threaded bore 54 disposed through clamp back 44. Clamping fastener 74, like clamping fastener 46, extends through both bore 52 and threaded bore 54 to draw clamp mount 38 and clamp back 44 together. Again, threaded bore 54 is threaded so clamping fastener 74 will be drawn linearly toward clamp back 44 while being threaded into threaded bore 54 during the clamping process. Bore 52 is illustratively a slot so that adjustment screw 56 can move clamp back 44 vertically (or linearly) with respect to clamp mount 38. Threaded post 78 of clamping fastener 74 is extendable through an illustrative washer 86 and fastener hole 84 of tie-down ring 80. This view also demonstrates how at least a portion of tie-down ring 82 extends from tie-down ring 80 and spaced apart from fastener hole 84. Tie-down ring back 88, illustratively, oriented at a transverse angle with respect to a portion of securement ring 82, as shown, may abut clamp mount 38 and align fastener hole 84 with bore 52 and threaded bore 54. It is appreciated that eyebolt ring 48 shown in FIGS. 7 and 8, may replace clamping fastener 74 and tie-down ring 80, to provide an alternate attachment member for the clamp assembly.

Figure 12:
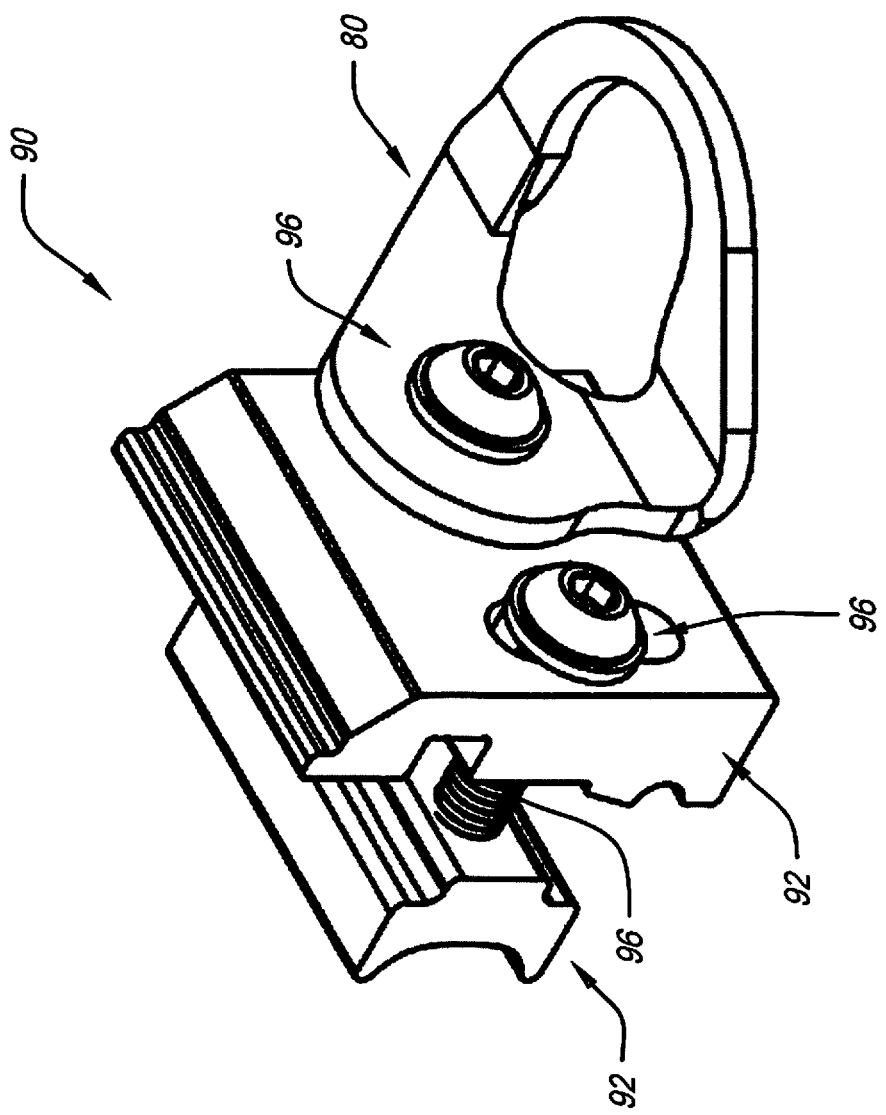
FIG. 12 is a perspective view of a clamp assembly.
Figure 13:
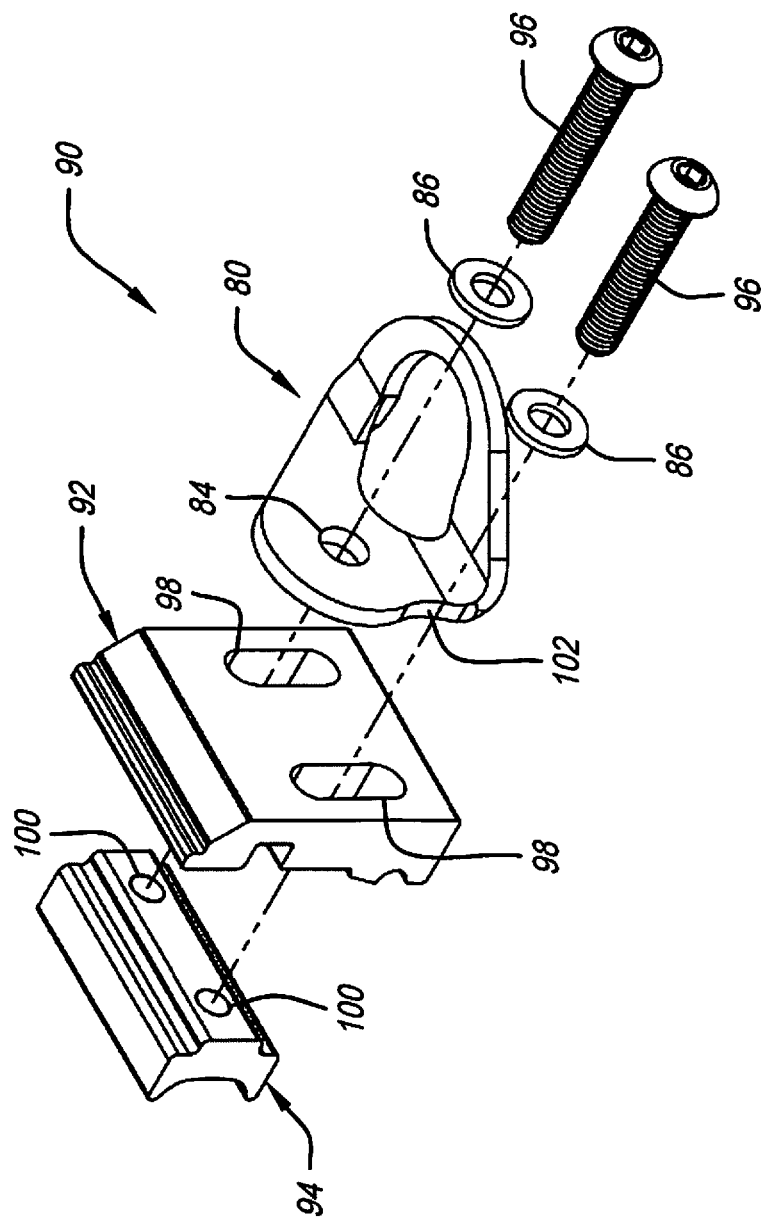
FIG. 13 is an exploded view of a clamp assembly.

It will be appreciated by the skilled artisan upon reading this disclosure that such attachment members like eyebolt ring 48 and tie-down ring 80 may be attached to rail clamps of any variety. For example, perspective and exploded perspective views of clamp assembly 90 are shown in FIGS. 12 and 13. Clamp assembly 90 differs from either of clamp assemblies 36 or 72 in that they are designed to attach to track inserts that line the inner sidewalls of certain truck beds. Accordingly, this design of clamp assembly 90 includes a track clamp mount 92 and track insert 94 that are brought together via fasteners 96 to clamp a rail onto the track. For this type of clamp, tie-down ring 80 may be, illustratively, disposed through one of fasteners 96 the same as that shown in FIG. 11 with respect to clamp assembly 72.

As shown, for example, in FIG. 13, a fastener 96 is disposed through a washer 86 and then through fastener hole 84 of tie-down ring 80. Fastener 96 can then extend through bore 98 of track clamp mount 92 and engage threaded bore 100 of track insert 94. An illustrative groove 102 can be formed in tie-down ring 80 so as not to interfere with a second fastener 96 that extends through another washer 86 and then directly through another bore 98 on track clamp mount 92 and another threaded bore 100 disposed in track insert 94, as shown.

Figure 14:
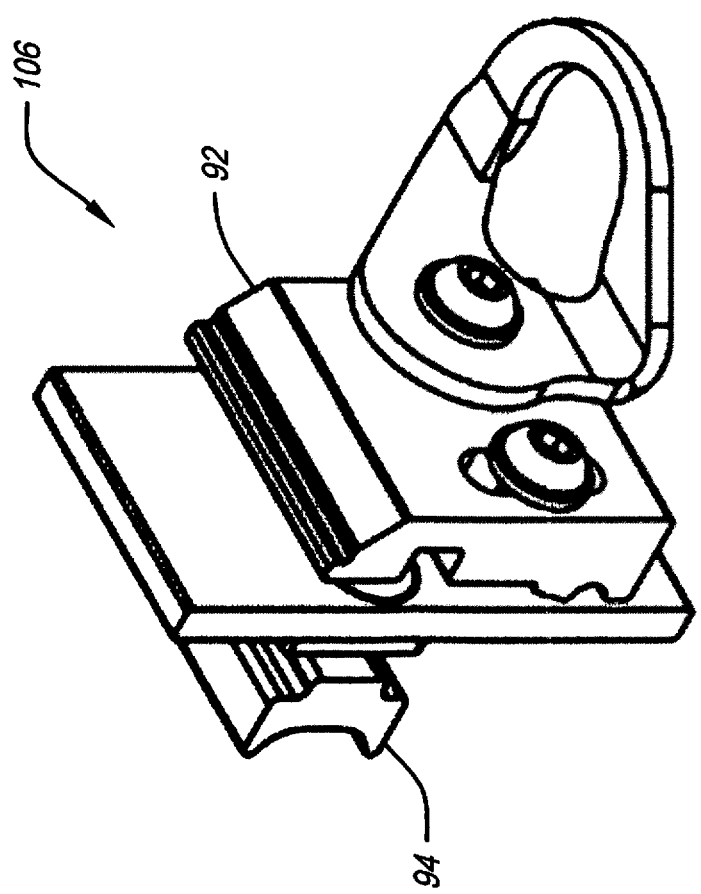
FIG. 14 is a perspective view of a clamp assembly.
Figure 15:
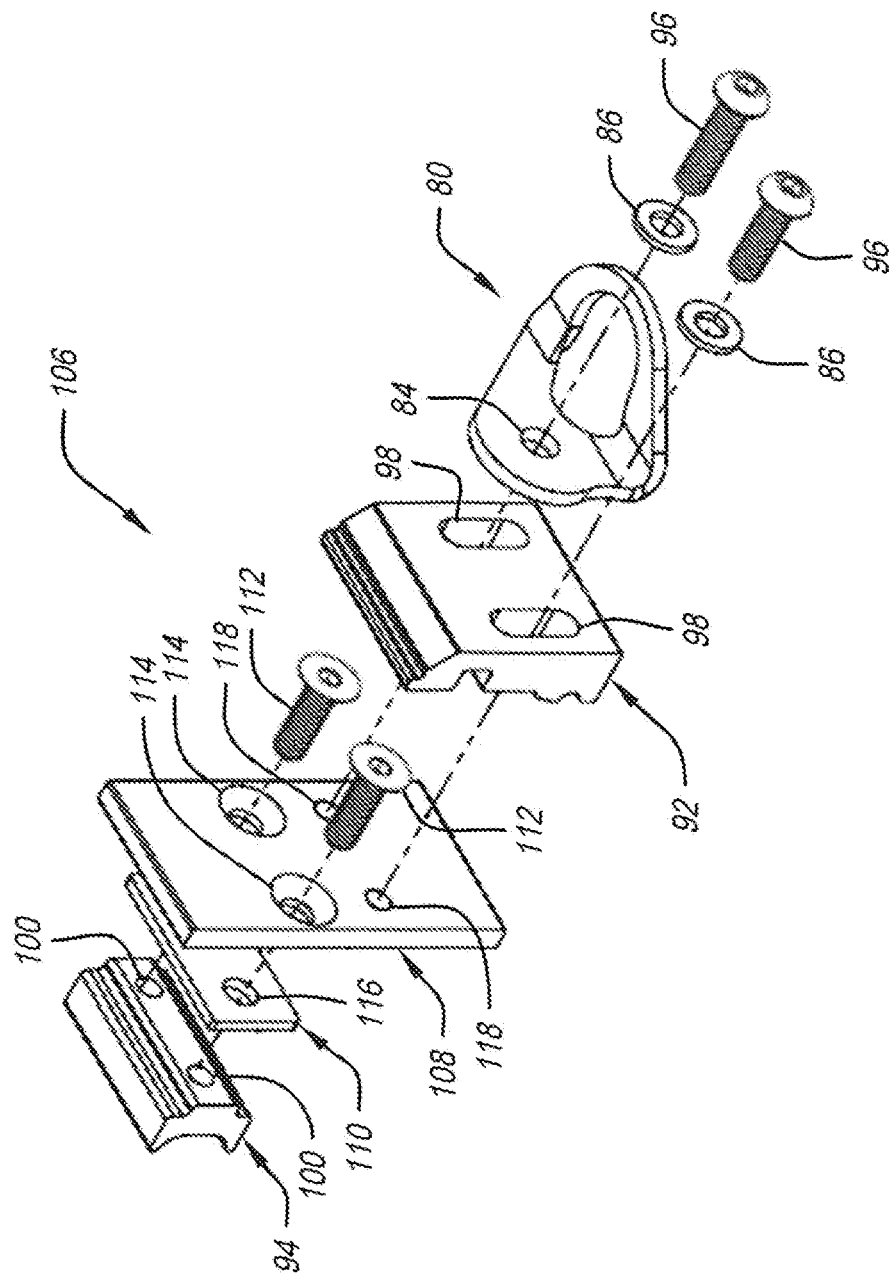
FIG. 15 is an exploded view of a clamp assembly.

Another example of a clamp assembly 106 is shown in FIGS. 14 and 15. A perspective view of clamp assembly 106 is shown in FIG. 14 whereas an exploded perspective view of clamp assembly 106 is shown in FIG. 15. This clamp assembly 106 is similar to clamp assembly 90 shown in FIGS. 12 and 13. In particular, clamp assembly 106 includes a track clamp mount 92 opposing a track insert 94. As shown in the exploded view of FIG. 15, however, clamp assembly 106 also includes a spacer 108 and shim 110 that are positioned between track clamp mount 92 and track insert 94.

Another illustrative embodiment of the present disclosure provides a securement system for the folding panel sections, such as panel sections 20, 22, and 24 of tonneau cover 14. Latching assemblies, such as latching assembly 32 shown in FIG. 2, is one way to secure the panel sections to the rail. Another illustrative embodiment of the present disclosure provides a hook and tab system that does not require affirmative unlatching of the panel section to release it from the rail. Instead, a hook is placed adjacent a leading edge of a panel section and a rail. A tab is attached to the rail and extends outwardly therefrom so that, when a panel section is lowered, the hook positions itself under the tab. This prevents the cover from being lifted straight up to gain access into the truck bed or cargo box. When the panel section is lifted at its rear, the pivot motion at the front end of the panel section moves the hook away from the tab, thereby releasing the panel section. It is appreciated that the rearmost panel may still include a conventional latch assembly that is not accessible without a key or the tailgate being lowered. Therefore, when the tonneau cover is laid flat over the truck bed, the hook and tabs keep the panel sections secured to the rails until the panel section at the tailgate end is unlatched and pivoted forward to open the tonneau cover like that shown in FIGS. 6A, 6B, 6C, 6D, and 6E. It is appreciated that these hook and tabs can be attached to each side of respective tonneau cover panel sections and rails.

Figure 16:
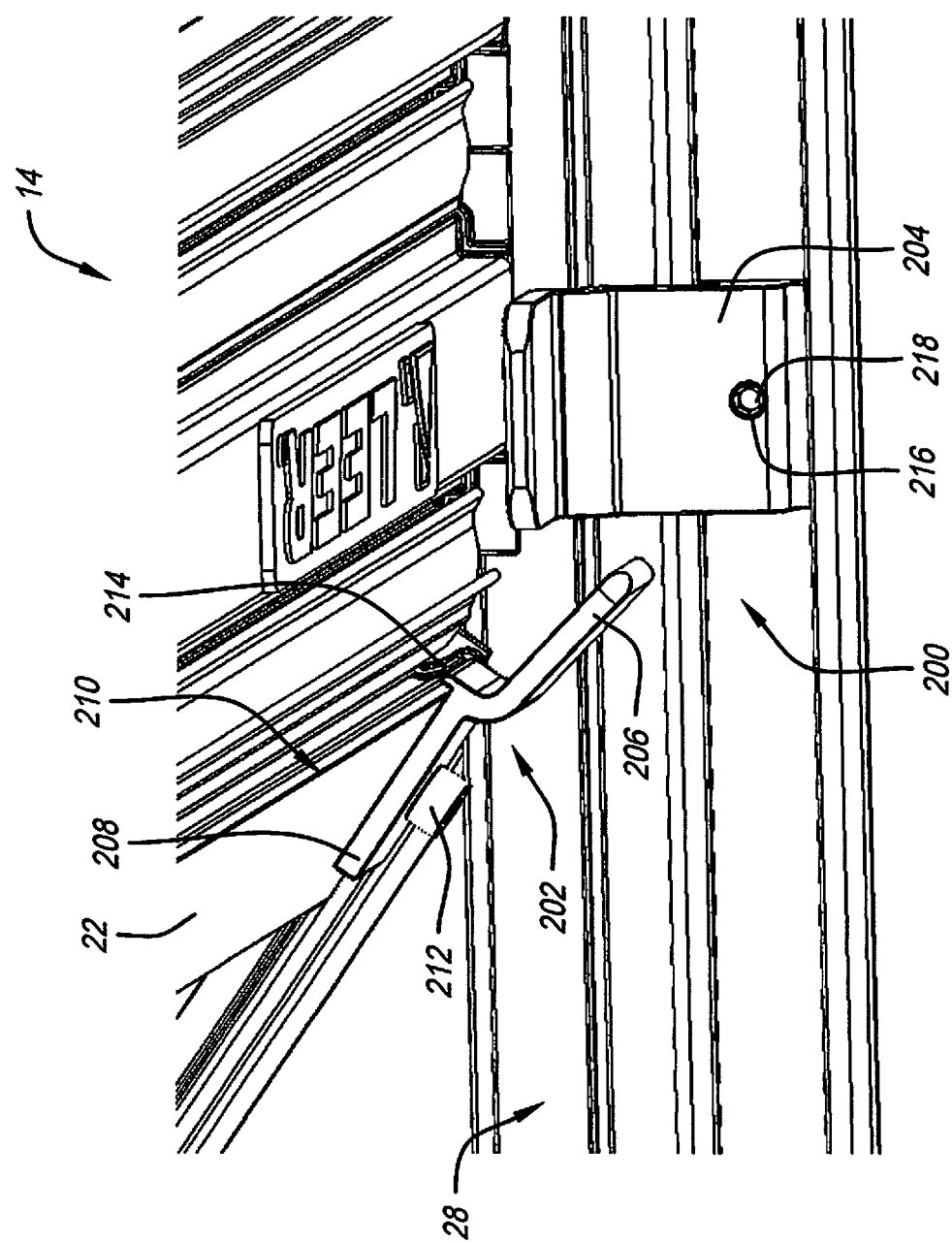
FIG. 16 is an underside perspective view of a portion of a tonneau cover and rail from inside the truck bed or cargo box.

An underside perspective view of a portion of tonneau cover 14 and rail 28, from the perspective of inside truck bed 4, is shown in FIG. 16. This view shows hook and tab assembly 200 with hook 202 attached to panel section 22 and tab 204 attached to rail 28. In this illustrative embodiment, hook 202 is composed of a hook portion 206 and attachment portion 208. Hook portion 206 extends forward of the panel section 22, while attachment portion 208 is fastened adjacent front edge 210, via fastener 212. Illustratively, a flange 214 extends from the front of attachment portion 208 to abut the front edge 210 of panel section 22 in order to provide consistent and repeatable positive placement of tab 204 on a panel section. It is appreciated that, although hook and tab assembly 200 is shown with respect to rail 28, a second hook and tab assembly 200 can be attached to tonneau cover 14 adjacent the opposite rail 30. This creates securement of the panel section on both sides of the tonneau cover. This view also shows a threaded set screw hole 216 disposed through tab 204. A set screw 218 is disposed in set screw hole 216 in order to affix tab 204 to rail 28.

Figure 17:
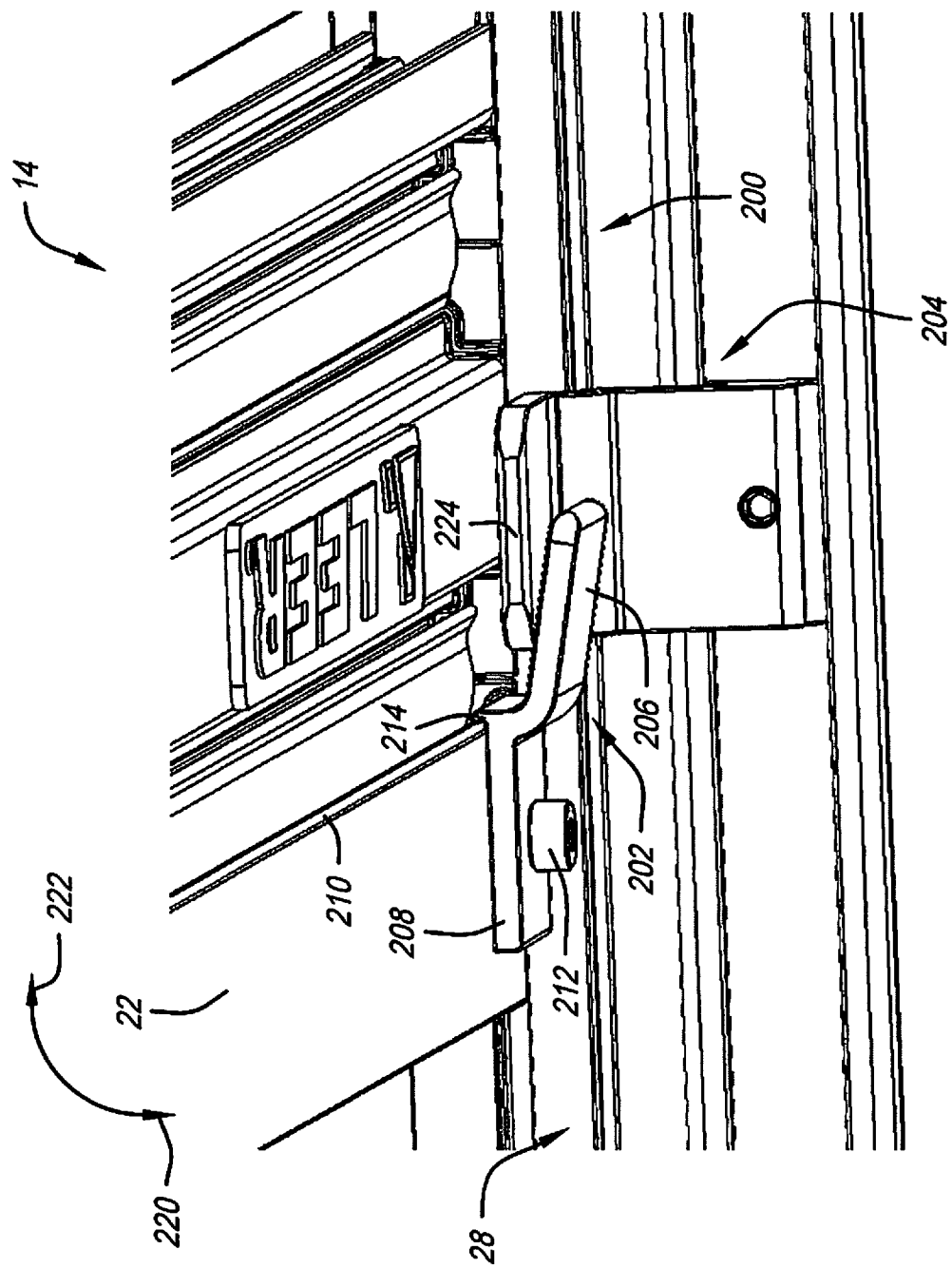
FIG. 17 is another perspective detail view of a portion of a tonneau cover and rail from inside the truck bed or cargo box.

Another perspective detail view of a portion of tonneau cover 14, from the perspective of inside the truck bed, is shown in FIG. 17. This view is similar to that of FIG. 16 except that panel section 22 has been pivoted downward in direction 220 to cover that portion of the truck bed. When this happens, as shown, hook portion 206 of hook 202 fits underneath tab portion 224 of tab 204. This prevents panel section 22 from being lifted and separated from rail 28. This view also shows flange 214 positioned against front edge 210 of panel section 22. It is appreciated that fastener 212 can be disposed through a frame portion of panel section 22, depending on the composition of the panel section, to assist in providing secure attachment of hook 202.

Figure 18A:
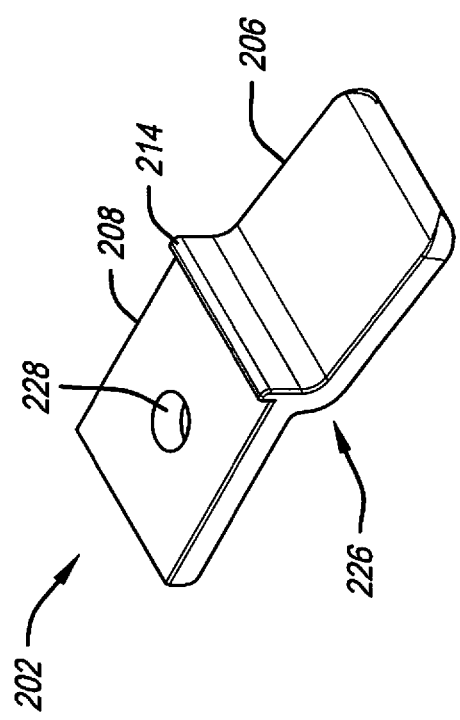
FIG. 18A is a perspective view of a hook.

Various views of hook 202 is shown in FIGS. 18A, 18B, 18C, and 18D. The perspective view of hook 202 in FIG. 18A shows hook portion 206 located adjacent attachment portion 208 with flange 214 extending up from a leading edge of attachment portion 208. In this illustrative embodiment, an arcuate transition 226 is formed between hook portion 206 and attachment portion 208 in order to provide clearance for hook portion 206 to fit under tab portion 224 when the panel section is lowered on top of the bed section or cargo box. A fastener hole 228 is sized and configured to receive fastener 212 for securing hook 202 to panel portion 22.

Figure 18B:
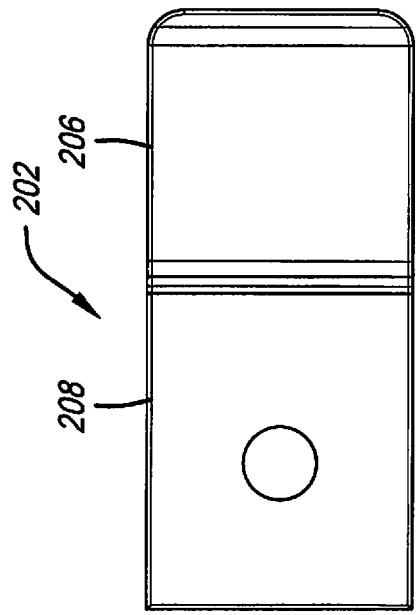
FIG. 18B is a top view of the hook.
Figure 18C:
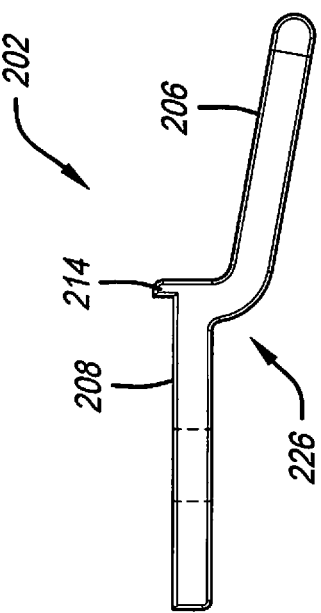
FIG. 18C is a side view of the hook.
Figure 18D:
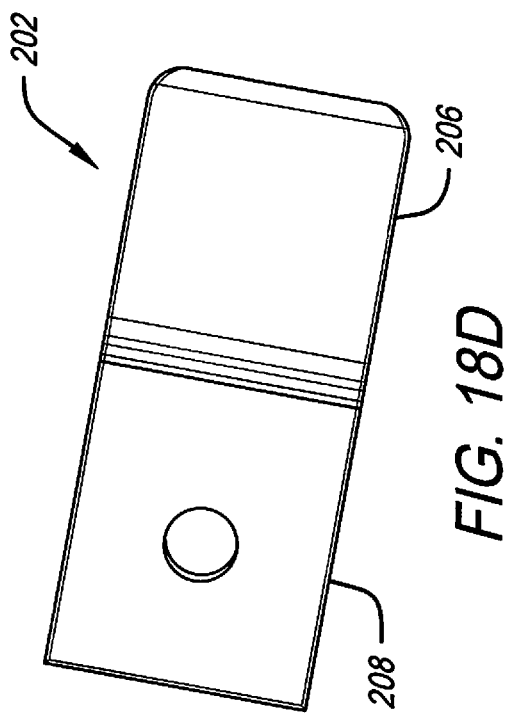
FIG. 18D is a bottom view of the hook.

The distinguishable hook portion 206 and attachment portion 208 are further shown in the top view of hook 202 in FIG. 18B and the bottom view for 202 shown in FIG. 18D. The side view of hook 202 shown in FIG. 18C not only accentuates the arcuate transition portion 226 between hook portion 206 and attachment portion 208, but also shows flange 214 extending transverse to attachment portion 208. It is appreciated that flange 214 provides a lip that can be positioned adjacent the front or leading edge of a panel section. This means a predetermined location of the hook portion 206 can be established. Hook portion 206 will extend from the front edge of a panel section a repeatable and predetermined amount when flange 214 abuts the front edge of a panel section.

Various views of tab 204 are shown in FIGS. 19A, 19B, 19C, and 19D. The perspective view of tab 204 in FIG. 19A shows tab portion 224 extending from base portion 230. Also extending from base portion 230 is rail insert 232. In this illustrative embodiment, rail insert 232 is spaced apart from tab portion 224 and is configured to fit into a predetermined rail profile, such as that of rails 28 and 30. It is appreciated that rail insert 232 may have any myriad of cross-sectional geometries that are based on corresponding channels (such as clamp channel 234) in the rails to hold tab 204. Set screw hole 216 is disposed through both base portion 230 and rail insert 232 (see FIG. 19C) in order to receive set screw 218 (see FIG. 16). Illustratively, set screw 216 assists in wedging rail insert 232 into the channel profile of the rail. (See FIG. 21).

The top view of tab 204, shown in FIG. 19B, demonstrates tab portion 224 extending in an opposite direction from rail insert 232. This is also demonstrated in the side view of FIG. 19C. Also shown in this view is how tab portion 224 is illustratively spaced apart from rail insert 232 with base portion 230 extending therebetween. The front view of tab 204, shown in FIG. 19D, further shows tab portion 224 and base portion 230, and is also appreciated from these views, that the corners of tab portion 224 opposite base portion 230 can be rounded.

A side view of rail 28 or 30 is shown in FIG. 20. This view further shows how tab 204 can be located at any desired distance along the longitudinal extent of either rails 28 or 30.

A detail perspective view of a portion of rail 28 or 30 is shown in FIG. 21. This view shows that rails 28 or 30 may include a clamping channel 234 that extends illustratively about the length of the rails. Clamping channel 234 is typically configured to receive one or more clamps for securing the rail to the sidewall of the truck bed or cargo box (see, also, FIGS. 2-5). However, rail insert 232, as shown in this view (see, also, FIG. 19C), can be complementarily shaped to that of the clamping channel so tab 204 may be inserted therein. When the desired location of tab 204 is reached along the clamping channel, set screw 218 can be disposed through set screw hole 216 to assist in wedging tab 204 within clamping channel 234. Illustratively, a desired location can be one such that tab portion 224 of tab 204 fits over hook portion 206 of hook 202 when a panel section is lowered onto the sidewalls of the truck bed.

Figure 22B:
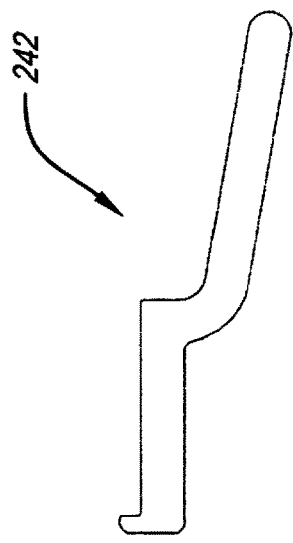
FIG. 22B is a perspective view of the hook.
Figure 22A:
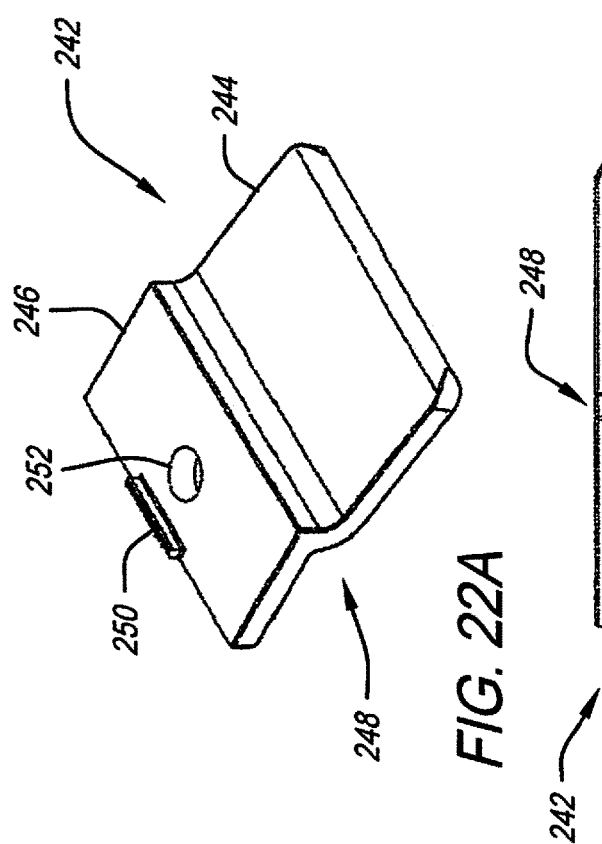
FIG. 22A is a perspective view of a hook.

Another illustrative embodiment of a hook 242, similar to hook 202, and usable in a hook and tab system with tab 204, is shown in FIGS. 22A, 22B, 22C, and 22D. The view shown in FIG. 22A depicts hook 242 with hook portion 244, attachment portion 246, and arcuate transition 248 located therebetween. This is similar to the corresponding features of hook 202. A distinction is that rather than a front flange, like flange 214 of hook 202, hook 242 includes a rear flange 250 extending transverse to the rear of attachment portion 246. This embodiment allows for repeatable positive placement of hook 242 on the underside of panel sections that have a frame edge adjacent, but not at the edge of the panel section. For example, hook 242 can be positioned on a front frame member of a panel section so rear flange 250 can engage rear edge 278 rather than the front or leading edge of that front frame member.

Figure 22D:
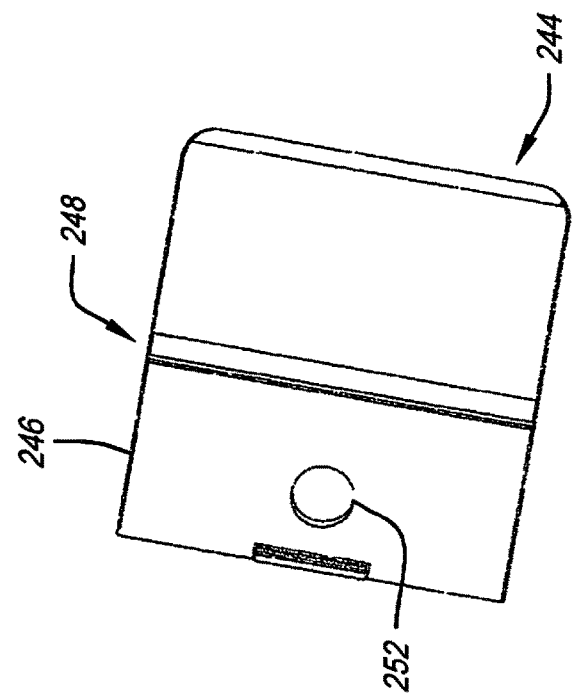
FIG. 22D is a side view of the hook.
Figure 22C:
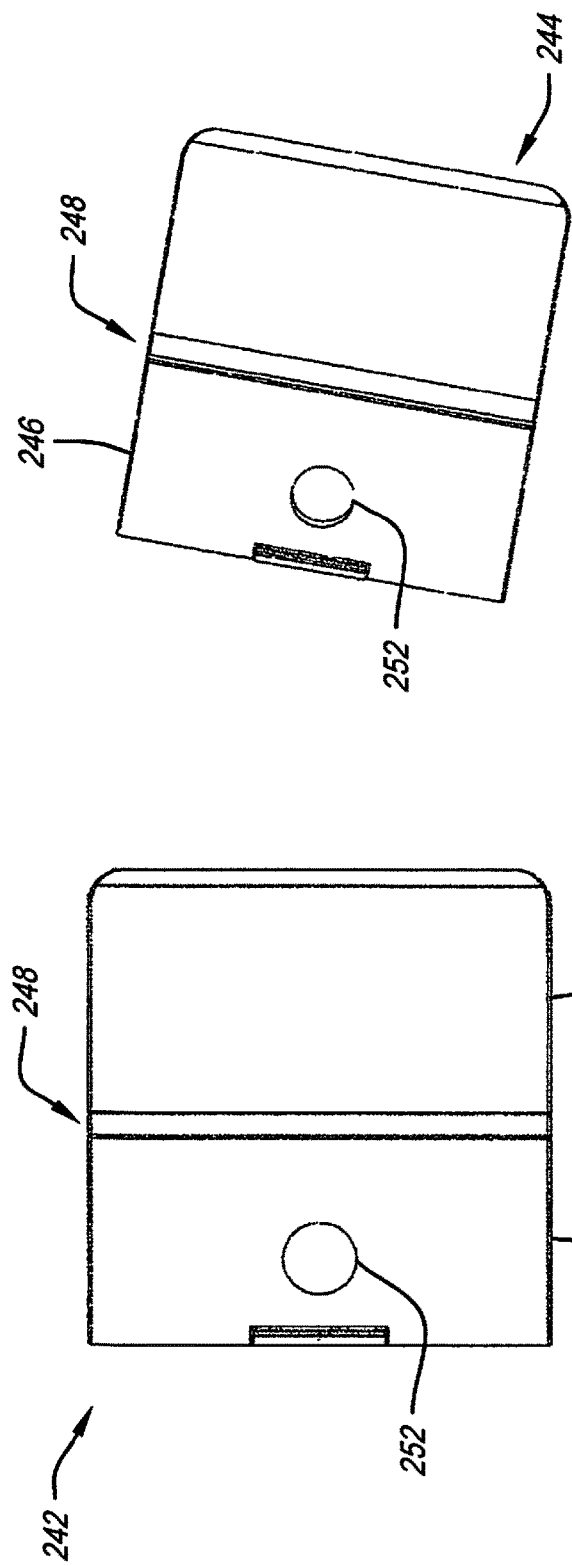
FIG. 22C is a top view of the hook.

Top and perspective views of hook 242 are also shown in FIGS. 22C and 22D. Also shown in these views is fastener hole 252. It is contemplated that a fastener, such as fastener 212, can be disposed through fastener hole 252 in order to secure hook 242 to the underside or other appropriate location of a panel section.

Figure 23:
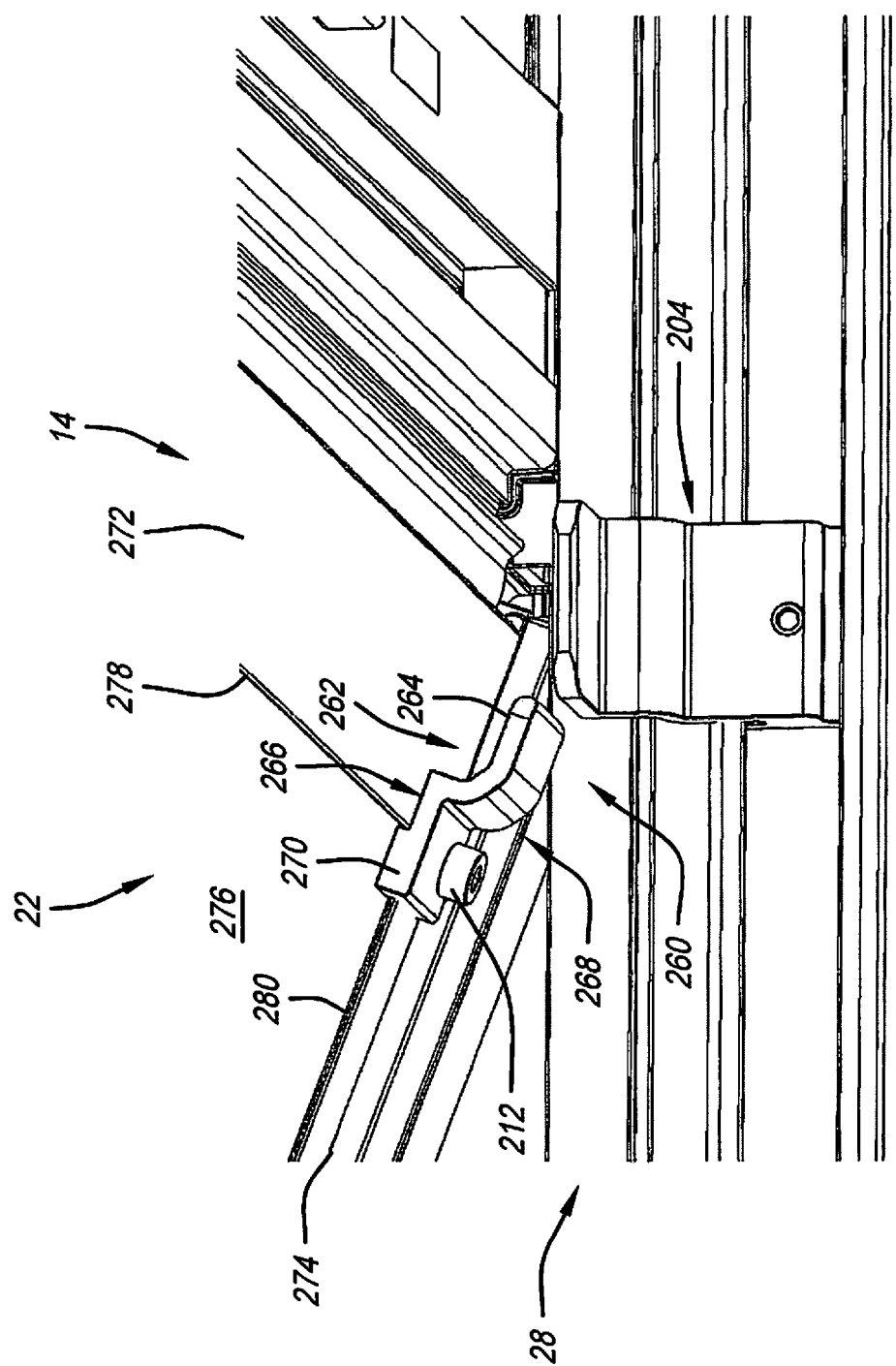
FIG. 23 is a perspective detail view of a portion of a tonneau cover and rail from the perspective of inside the truck bed or cargo box.

A perspective detail view of a portion of tonneau cover 14, with rail 28 from the perspective of inside the truck bed, is shown in FIG. 23. This view is similar to that of FIG. 16 with the exception of hook and tab assembly 260 including hook 262. Tab 204 may be configured the same as that shown in the prior figures or modified to any extent needed to accommodate hook 262. In the illustrative embodiment, hook 262 is similar to the prior embodiments in that it includes a hook portion 264, attachment portion 266, and arcuate transition 268 located between the two. A difference is that attachment portion 266 includes a set block 270 configured to provide repeatable positive placement of the hook on the panel section. As shown herein, panel section 22 illustratively includes a front frame member 272 and side frame member 274 that, combined with an opposing side frame member and rear side frame member, bound the periphery of a panel portion 276 of panel section 22. Typically, the frames are made of extruded aluminum or other like material that holds the panel portion therebetween. Also, typically, there is an interior edge of the frames that bound the panel portion of the panel section. As shown herein, edges 278 and 280 of frame members 272 and 274, respectively, are positioned adjacent the underside surface of the panel portion. It is at this juncture, between edges 278 and 280, that set block 270, which is a raised section of attachment portion 266, abuts. In other words, set block 270 is fitted up against edges 278 and 280 of frame members 272 and 274, respectively. This results in another mechanism for repeatable positive placement of hook 262, which provides a predetermined and predictable location so that tab 204 can be positioned to fit between hook portion 264 and the underside of panel section 22.

Figure 24:
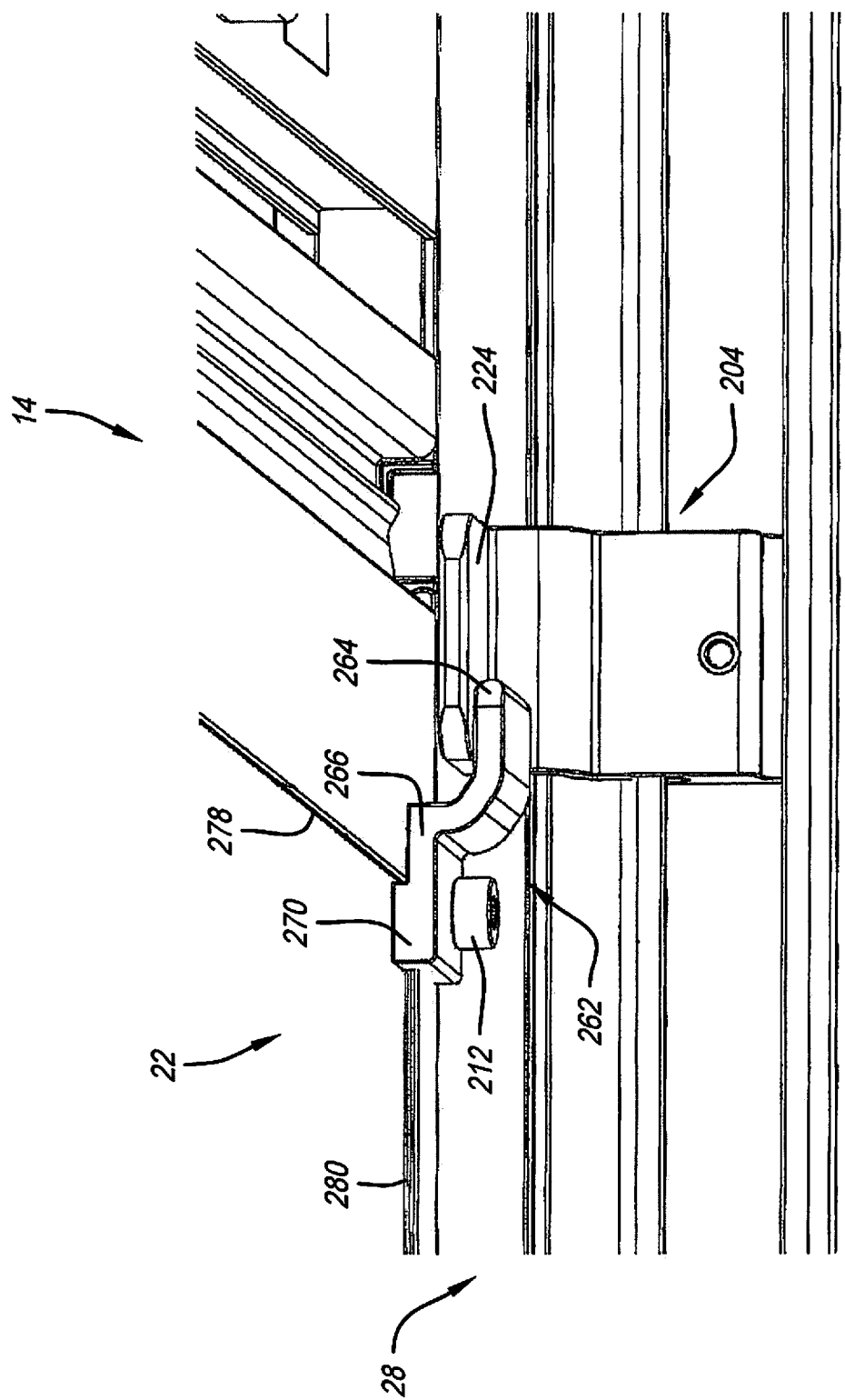
FIG. 24 is another perspective detail view of a portion of a tonneau cover and rail from the perspective of inside the truck bed or cargo box.

Another detail perspective view of a portion of tonneau cover 14 and rail 28 is shown in FIG. 24. In this case, panel section 22 is lowered over the truck bed so that hook portion 264 of hook 262 fits under tab portion 224 of tab 204. Like the other embodiments, with the hook and tab in this configuration, panel 22 cannot be lifted straight up off the cargo box sidewalls. Preceding panels from the tailgate end will first need to be folded up, one after another, and then panel section 22 folded (see FIGS. 6A-6D), before panel section 22 or panel section 24, in front, can be moved. It is this ability of the panel section to pivot that releases hook portion 264 from tab portion 224. Otherwise, this view similarly shows attachment portion 266 with set block 270 positioned against both edges 278 and 280. Fastener 212 may extend through attachment portion 266 to secure same to panel section 22.

Figure 25:
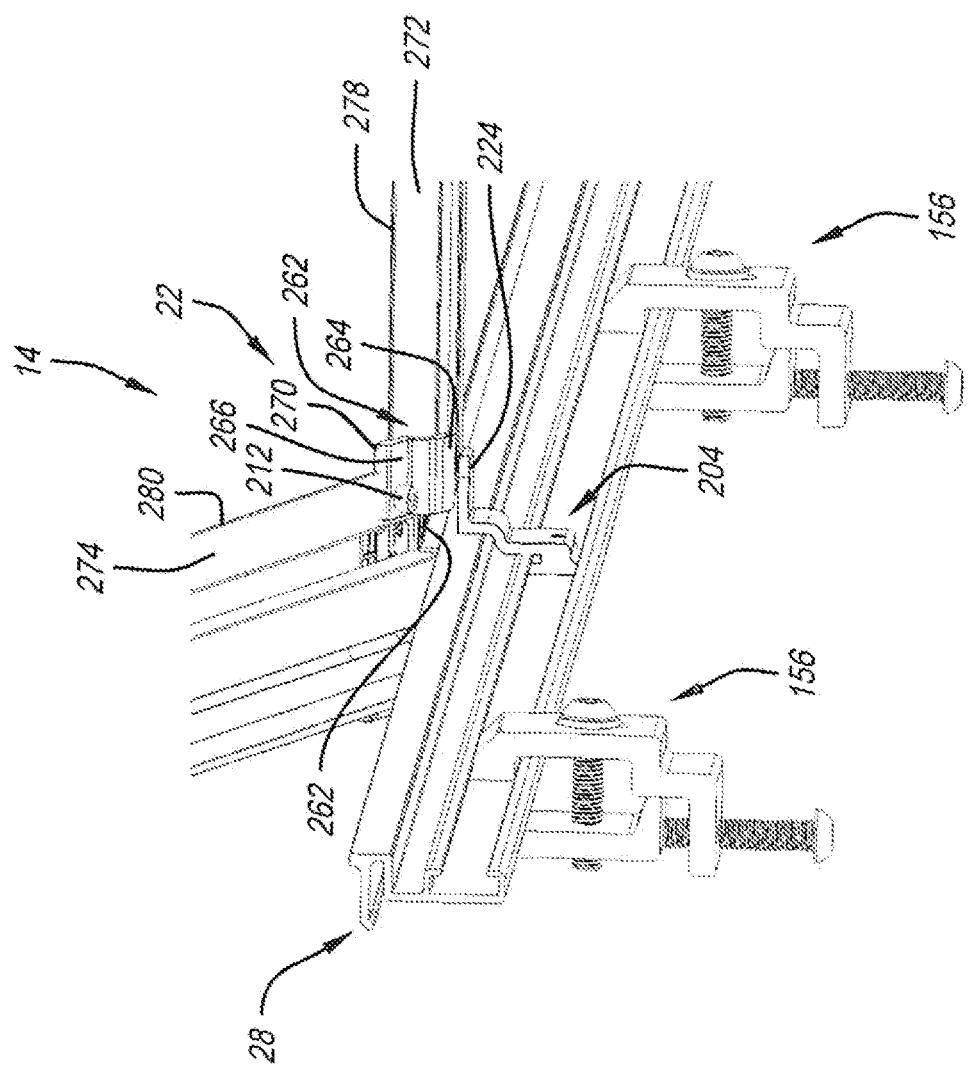
FIG. 25 is an isolated perspective detail view of a portion of a tonneau cover and rail.

An isolated perspective detail view of tonneau cover 14, with rail 28, is shown in FIG. 25. This view further depicts how tab portion 224 of tab 204 extends from rail 28 and is able to position itself between the underside of panel section 22 and hook portion 264 of hook 262. This view also shows set block 270 fitted in a corner formed by edges 278 and 280 of frame members 272 and 274, respectively. This view further aids in demonstrating how this corner of the frames create a consistent positioning location for hook 262. This view also shows fastener 212 disposed through the attachment portion 266 of hook 262.

Figure 26:
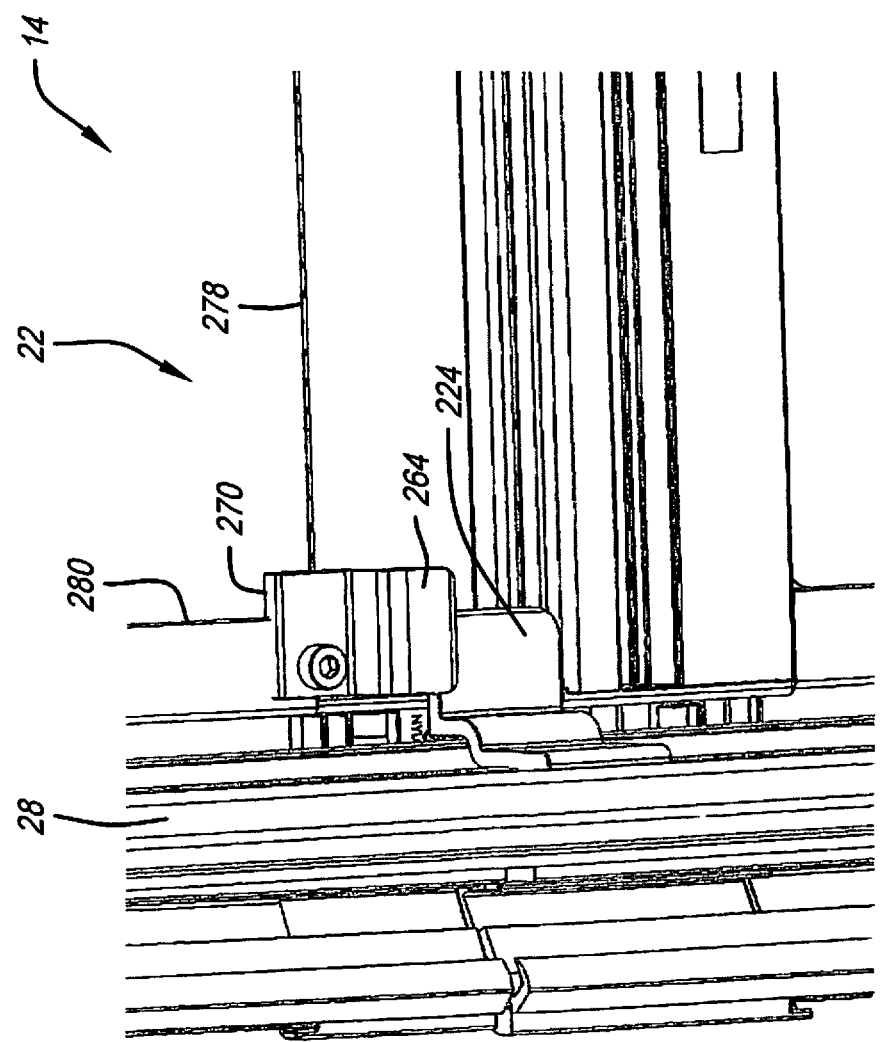
FIG. 26 is an underside detail view of a portion of a tonneau cover and rail.

An underside detail view of tonneau cover 14, with hook portion 264 being positioned under tab portion 224, is shown in FIG. 26. This view further illustrates how tab portion 224 serves a blocking function to prevent panel section 22 or the adjacent panel section 24 from moving upward while hook portion 264 is located underneath, and panel section 22 is setting on the truck bed. Like in FIG. 25, this view demonstrates how set block 270 is positionable in a corner formed by frame edges 278 and 280.

Figure 28:
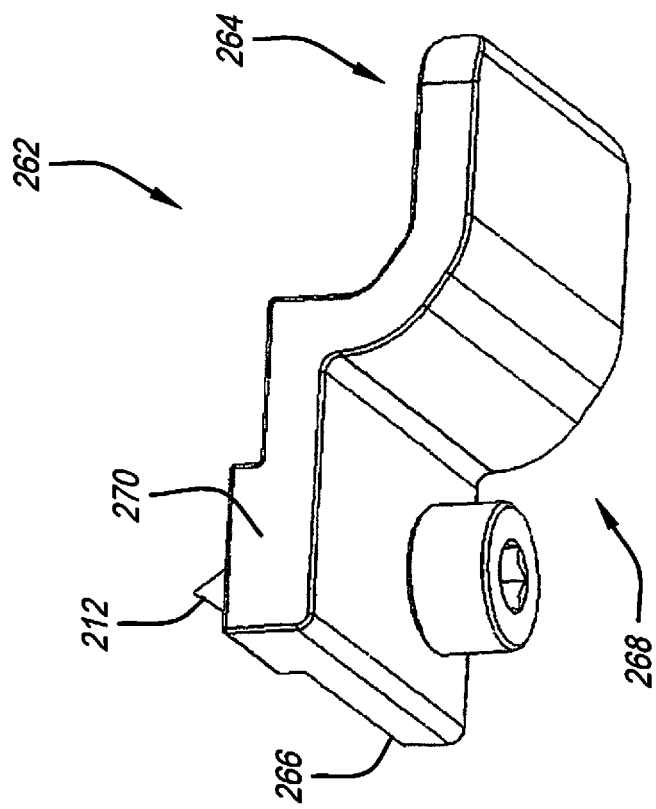
FIG. 28 is an underside perspective view of the hook.
Figure 27:
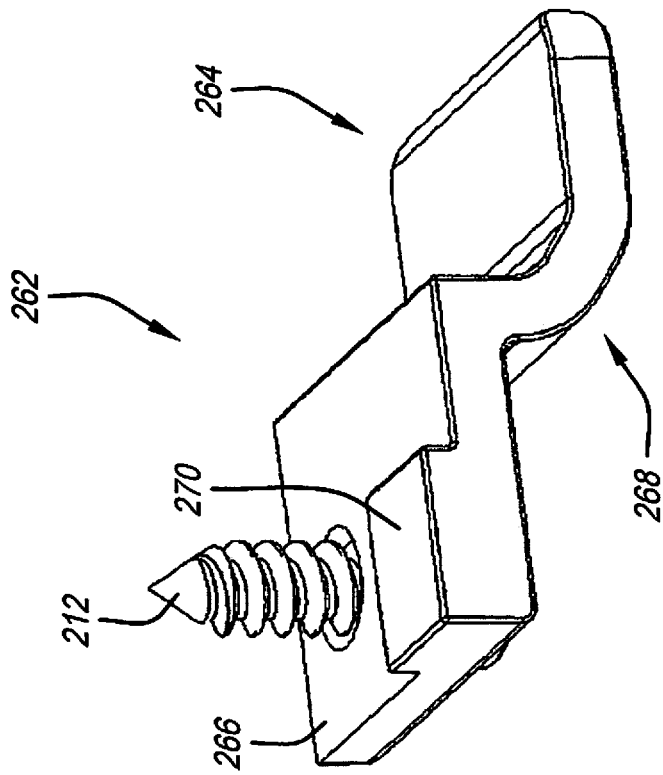
FIG. 27 is perspective view of a hook.

Top perspective and underside perspective views of hook 262 are shown in FIGS. 27 and 28, respectively. Both views show hook portion 264, attachment portion 266, and arcuate transition portion 268 located therebetween. These views also show an illustrative configuration of set block 270, which can be a cube having a polygonal shape, triangular, square, or arcuate footprint. The square-shaped flange, illustratively shown, extends upward transverse to the orientation of attachment portion 266. This view also depicts fastener 212 disposed through attachment portion 266 to attach to the underside surface of a panel section.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional patent application that may differ from the priority application the disclosure from this non-provisional patent application controls.

What is claimed:

1. A clamp assembly for use with a tonneau cover assembly that covers a cargo box of a pickup truck, the clamp assembly comprising:
   a first clamp member;
   a second clamp member located opposite the first clamp member to form a space located therebetween; and
   a clamp fastener extended through the first clamp member, the space between the first clamp member and the second clamp member, and the second clamp member;
   wherein the clamp fastener includes an attachment member configured to receive securement structures that are not otherwise attached to the clamp assembly; and
   wherein when the clamp assembly is clamped onto the cargo box the attachment member is located within the cargo box and underneath at least one panel of the tonneau cover assembly.

2. The clamp assembly of claim 1, wherein the attachment member is an eyebolt that includes a ring that extends opposite of a threaded post portion of the eyebolt.

3. The clamp assembly of claim 1, wherein the attachment member includes a tie-down ring that extends opposite of a threaded post portion of the attachment member.

4. The clamp assembly of claim 1, wherein the attachment member includes a tie-down ring positioned adjacent a head end and a threaded post portion that extends from the head end of the attachment member.

5. The clamp assembly of claim 1, wherein the attachment member is integrally part of the clamp fastener.

6. The clamp assembly of claim 1, wherein the attachment member and the clamp fastener is a single-component structure.

7. The clamp assembly of claim 1, wherein the attachment member includes an opening that the clamp fastener extends through to secure the attachment member to the first clamp member.

8. The clamp assembly of claim 1, wherein the attachment member includes a first opening bounded by a ring and a second opening disposed through the attachment member, wherein the clamp fastener is extendable through the second opening to secure the attachment member to the first clamp member.

9. The clamp assembly of claim 1, wherein the attachment member includes an opening bounded by a ring, wherein a portion of the ring is oriented transverse to a second portion of the ring.

10. The clamp assembly of claim 1, wherein the attachment member includes an opening bounded by a ring, wherein the opening is positionable to a plurality of orientations with respect to the clamp assembly.

11. The clamp assembly of claim 1, wherein the first clamp member is a clamp mount and the second clamp member is a clamp back.

12. They clamp assembly of claim 1, wherein the attachment member is integrally part of the clamp fastener, wherein the attachment member includes a ring, and wherein rotation of the ring rotates the clamp fastener.

13. The clamp assembly of claim 1, wherein the attachment member is integrally part of the clamp fastener, wherein rotation of the attachment member rotates the clamp fastener.

14. The clamp assembly of claim 13, wherein the rotation of the clamp fastener causes the clamp fastener to extend into the second clamp member.

15. A clamp assembly for use with a tonneau cover assembly that covers a cargo box of a pickup truck, the clamp assembly comprising:
   a clamp mount;
   a clamp back located opposite the clamp mount; and
   a clamp fastener extended through the clamp mount and the clamp back;
   wherein the clamp fastener includes an attachment member configured to receive securement structures that are not otherwise attached to the clamp;
   wherein rotation of the attachment member rotates the clamp fastener; and
   wherein when the clamp assembly is clamped onto the cargo box the attachment member is located within the cargo box and underneath at least one panel of the tonneau cover assembly.

16. The clamp assembly of claim 15, wherein the attachment member includes an opening bounded by a ring, wherein the opening is positionable to a plurality of orientations with respect to the clamp assembly.

17. The clamp assembly of claim 15, wherein the clamp mount and the clamp back form a space located therebetween, and wherein the clamp fastener is extended through the clamp mount, the space between the clamp mount and the clamp back, and the clamp back.

18. The clamp assembly of claim 15, wherein the attachment member includes a ring.

19. A clamp assembly for use with a tonneau cover assembly that covers a cargo box of a pickup truck, the clamp assembly comprising:
   a clamp mount;
   a clamp back located opposite the clamp mount;
   a clamp fastener that includes a head end and a threaded post portion that extends from the head end;
   wherein the threaded post portion is extended through the clamp mount and the clamp back;
   a tie-down ring positioned adjacent the head end and the threaded post portion of the clamp fastener; and
   wherein when the clamp assembly is clamped onto the cargo box the tie-down ring is located within the cargo box and underneath at least one panel of the tonneau cover assembly.

20. The clamp assembly of claim 19, wherein the tie-down ring includes an opening through which the threaded post portion of the clamp fastener extends.

* * * * *